United States Patent
Jin et al.

(10) Patent No.: US 9,154,501 B2
(45) Date of Patent: Oct. 6, 2015

(54) MACHINE-TO-MACHINE COMMUNICATIONS PRIVACY PROTECTION METHOD AND SYSTEM, MACHINE-TO-MACHINE COMMUNICATIONS SERVICE MANAGEMENT ENTITY, AND RELATED DEVICE

(75) Inventors: Lei Jin, Nanjing (CN); Yonggang Bian, Nanjing (CN); Yongjing Zhang, Nanjing (CN); Xianfeng Chen, Nanjing (CN); Qi Lin, Nanjing (CN); Lunjian Mu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 144 days.

(21) Appl. No.: 13/584,291

(22) Filed: Aug. 13, 2012

(65) Prior Publication Data

US 2013/0160140 A1 Jun. 20, 2013

Related U.S. Application Data

(63) Continuation of application No. PCT/CN2012/072172, filed on Mar. 12, 2012.

(30) Foreign Application Priority Data

Mar. 11, 2011 (CN) .......................... 2011 1 0059215

(51) Int. Cl.
*G06F 17/30* (2006.01)
*H04L 29/06* (2006.01)
(Continued)

(52) U.S. Cl.
CPC ............ *H04L 63/10* (2013.01); *H04L 63/0407* (2013.01); *H04W 4/02* (2013.01); *H04W 12/02* (2013.01); *H04W 4/005* (2013.01)

(58) Field of Classification Search
None
See application file for complete search history.

(56) References Cited

U.S. PATENT DOCUMENTS

2003/0204582 A1 10/2003 Shimoda
2009/0191857 A1* 7/2009 Horn et al. .................... 455/419

(Continued)

FOREIGN PATENT DOCUMENTS

CN 1522085 A 8/2004
CN 1885992 A 12/2006

(Continued)

OTHER PUBLICATIONS

Search report issued in corresponding Chinese application No. 201110059215.7, and English therefor, dated Apr. 10, 2012, 5 pages total.
Search report issued in corresponding PCT application No. PCT/CN2012/072172, dated Jun. 21, 2012.

(Continued)

*Primary Examiner* — Brandon Hoffman
(74) *Attorney, Agent, or Firm* — Huawei Technologies Co., Ltd.

(57) ABSTRACT

Embodiments of the present invention provide a machine-to-machine communications privacy protection method and system, a machine-to-machine communications service management entity, and a related device. The method includes: after receiving a location access message, determining, by a service management entity and according to locating information, an entity that performs privacy inspection; and triggering, by the service management entity, the entity that performs privacy inspection to perform privacy inspection. The M2M service management entity determines in advance the entity that performs privacy inspection and triggers the entity that performs privacy inspection to perform privacy inspection. Therefore, with the method provided in the present invention, message interaction on an mId interface is reduced, thereby reducing a message overhead. In this way, a network load is reduced, and especially for a wireless network with an air interface, benefit that reduction of a signaling overhead brings is greater.

5 Claims, 18 Drawing Sheets

(51) Int. Cl.
*H04W 12/02* (2009.01)
*H04W 4/02* (2009.01)
*H04W 4/00* (2009.01)

(56) References Cited

U.S. PATENT DOCUMENTS

| | | | |
|---|---|---|---|
| 2010/0081451 A1* | 4/2010 | Mueck et al. | 455/456.1 |
| 2010/0197268 A1* | 8/2010 | Raleigh | 455/408 |
| 2012/0047558 A1* | 2/2012 | Sundaram et al. | 726/3 |
| 2012/0106431 A1 | 5/2012 | Wu et al. | |

FOREIGN PATENT DOCUMENTS

| | | |
|---|---|---|
| CN | 101155025 A | 4/2008 |
| CN | 101194526 A | 6/2008 |
| CN | 101765202 A | 6/2010 |
| CN | 101860807 A | 10/2010 |
| CN | 101895858 A | 11/2010 |
| CN | 101959133 A | 1/2011 |
| CN | 102137105 A | 7/2011 |
| WO | 2009092115 A2 | 7/2009 |

OTHER PUBLICATIONS

First Office Action of corresponding Chinese Patent Application No. 201110059215.7, mailed on Jun. 21, 2012.
ETSI: "TS 102.921V<0.2.1>: Machine-to-Machine communications (M2M); mla, dla and mld interfaces", Jan. 2011.
ETSI: "TS 102 690 V0.10.4 : Machine-to-Machine communications (M2M); Functional architecture", Jan. 2011.
International Search Report & Written Opinion issued in corresponding PCT application No. PCT/CN2012/072172, dated Jun. 21, 2012, total 8 pages.
Search report issued in corresponding European patent application No. 12738008.7, dated Aug. 9, 2013, total 7 pages.
ETSI Draft: Machine-to-Machine communications (M2M); mla, dla and mid interfaces; ETSI TS 102.921 V<0.x.0>, Sep. 2010, total 21 pages.
J. Cuellar et al: "Geopriv Requirements", Network Working Group, Request for Comments: 3693, dated Feb. 2004, total 27 pages.
J. Peterson: "A Presence-based GEOPRIV Location Object Format", Network Working Group, Request for Comments: 4119, dated Dec. 2005, total 22 pages.
3GPP TR 23.871, "Enhanced support for User Privacy in location services (Release 5)", dated Mar. 2002, total 30 pages.

* cited by examiner

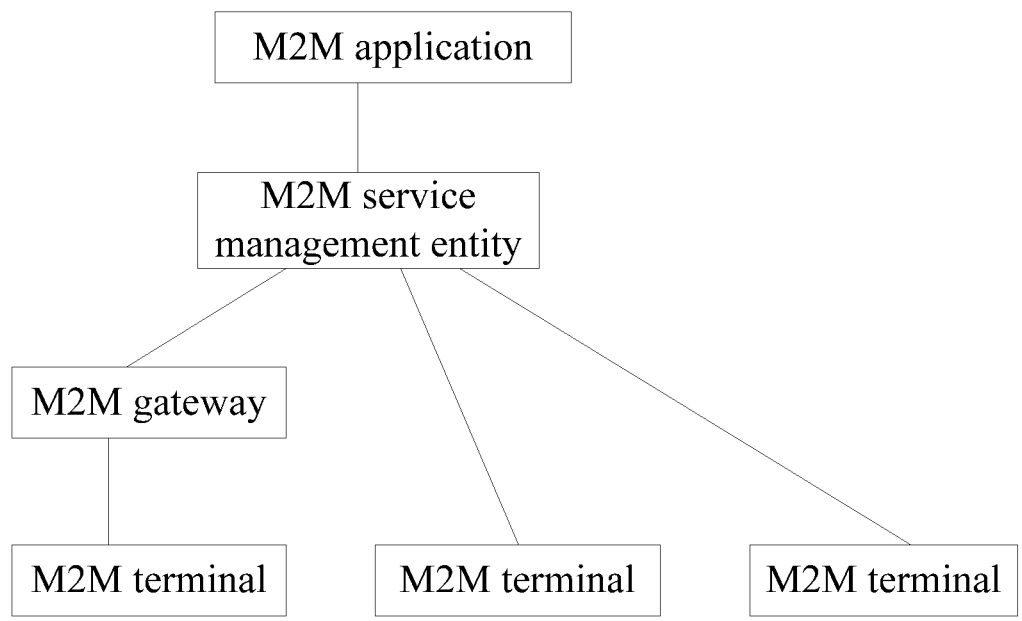
FIG. 1-a (Prior Art)
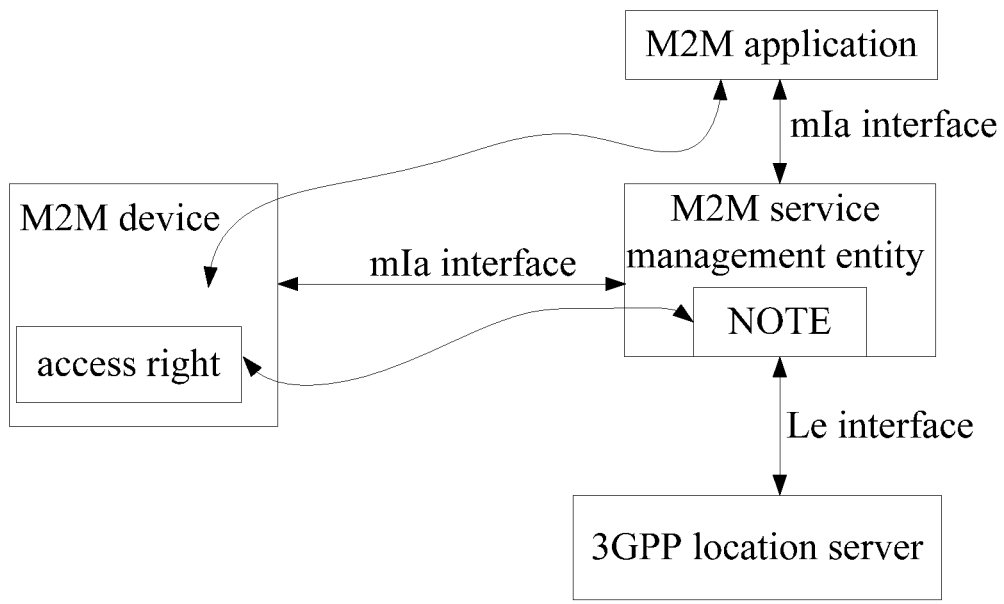
FIG. 1-b (Prior Art)

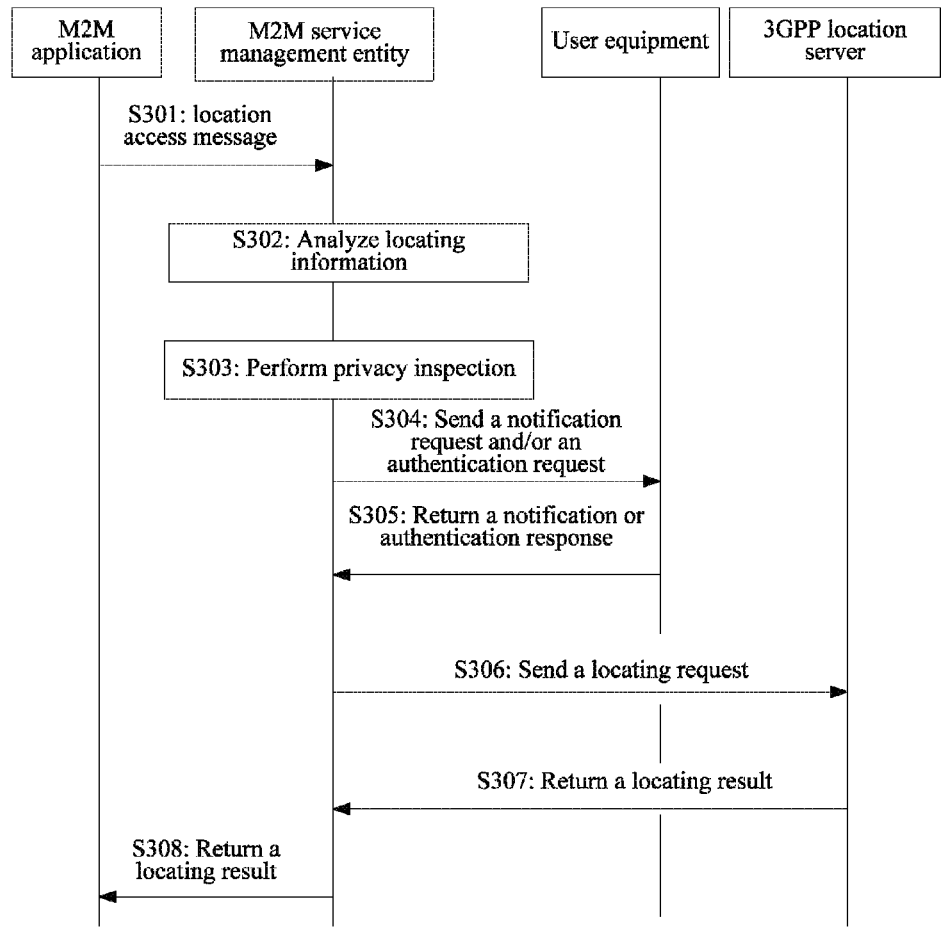
FIG. 3-a

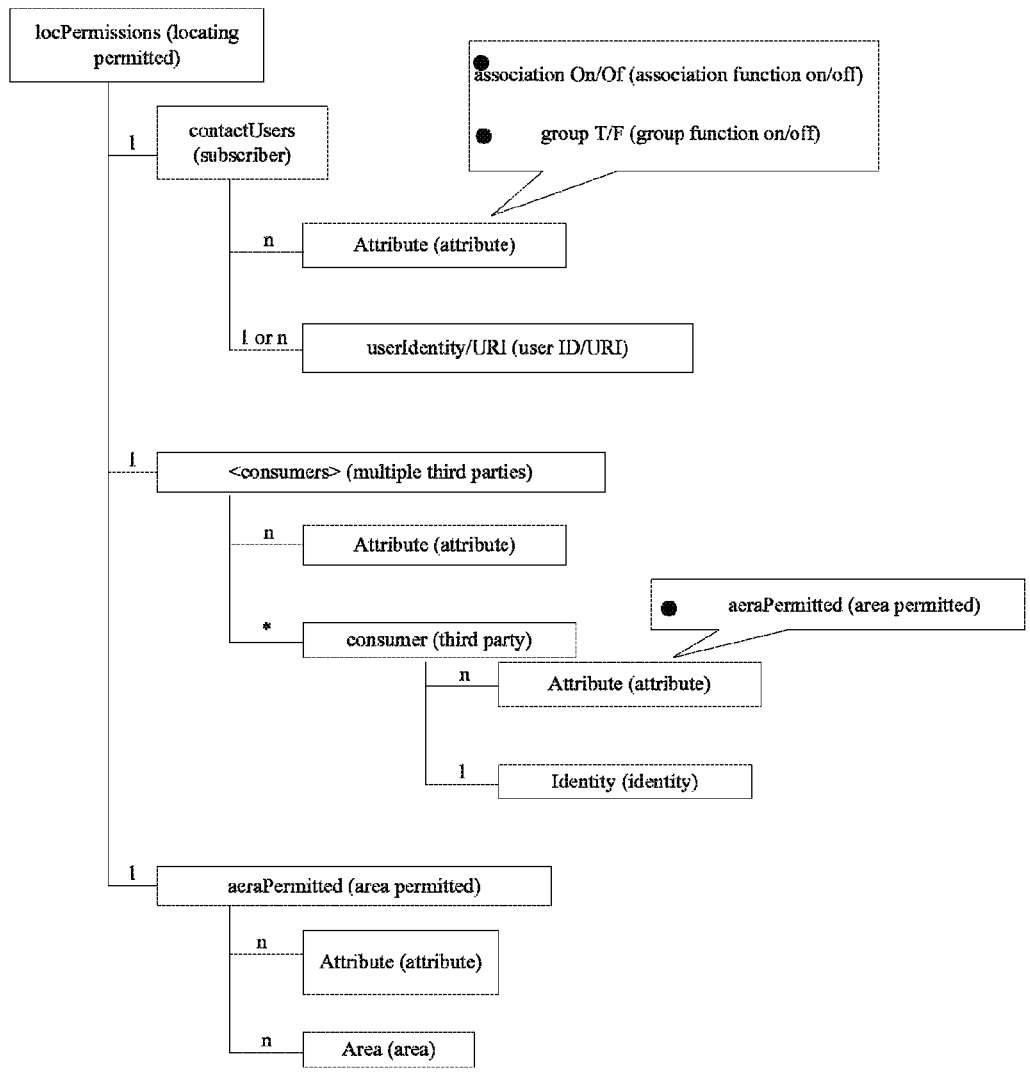
FIG. 3-b

MACHINE-TO-MACHINE COMMUNICATIONS PRIVACY PROTECTION METHOD AND SYSTEM, MACHINE-TO-MACHINE COMMUNICATIONS SERVICE MANAGEMENT ENTITY, AND RELATED DEVICE

This application is a continuation of International Application No. PCT/CN2012/072172, filed on Mar. 12, 2012, which claims priority to Chinese Patent Application No. 201110059215.7, filed on Mar. 11, 2011, both of which are hereby incorporated by reference in their entireties.

FIELD OF THE INVENTION

The present invention relates to the communications field, and in particular, to a machine-to-machine communications privacy protection method and system, a machine-to-machine communications service management entity, and a related device.

BACKGROUND OF THE INVENTION

Machine-to-machine communications (M2M) is a network-based application and service that focuses on intelligent machine interaction. In M2M, a wireless or wired communication module and application processing logic are embedded in a machine for implementing data communication without manual intervention, so as to satisfy informatization requirements of a user in aspects such as monitoring, commanding and dispatching, data collection and measurement. FIG. 1-a shows a typical M2M system architecture, where various M2M terminals (for example, a sensor and a microcontroller) access an M2M service management entity (Service Capability Layer, SCL) directly or remotely through an M2M gateway, and in various M2M applications (for example, electricity metering and intelligent traffic), data collected by the M2M terminals is acquired or the M2M terminals are remotely controlled and managed through a service capability that is provided by the M2M service management entity.

An overall objective of the European Telecommunications Standards Institute for Machine-to-Machine Communications (ETSI M2M) is to create an open standard for M2M communications to promote establishment of a future network that integrates various devices and services, enable an M2M service to have interoperability, and enable the M2M applications to share a basic service and be implemented independently of a network. In the EISI M2M standard, a location application programming interface (API) is defined on an mIa interface between an M2M application and the M2M service management entity, so that in the M2M application, location information may be acquired and a change of the location information may be subscribed to.

An issue of privacy protection is closely related to the location information. The privacy protection refers to that when personal data in electronic communication is processed, a user has permission to specify when and where a third party is allowed to collect location information of the user, and has permission to delete permission for the third party to collect the location information of the user. Therefore, the privacy protection is an issue that must be considered for locating in human to human communications (H2H). For example, in a 3rd-Generation Partnership Project (3GPP) network, privacy protection is implemented by an independent entity such as a privacy profile register (PPR) or a gateway mobile location center (GMLC), and is a kind of privacy protection with a centralized architecture. Its implementation procedure is: After an external location service (LCS) client initiates a location acquiring command through an Le interface or an OSA-LCS interface, the location acquiring command is transferred to a home gateway mobile location center (HGMLC), or is further sent by the HGMLC to the PPR entity through an Lpp interface for privacy protection to check whether the external LCS client has permission to locate a user equipment (UE). If the external LCS client does not have the permission, a message is returned to the external LCS client; and if the external LCS client has the permission, a 3GPP locating process is further performed. A privacy protection mechanism includes a process of sending a privacy notification (that is, a locating notification) to the UE or a process of performing UE privacy authentication. In the latter process, the external LCS client has permission to perform locating only after the user confirms (for example, through a user interface of the UE) that the locating is allowed. In addition, different privacy permission may be set for one UE in different location areas.

For various industries employing M2M, for example, intelligent home, intelligent automobile, and intelligent electricity metering, an M2M device is used as a personal device and a location of the device identifies location information of a user to a great extent. Therefore, in the M2M, an issue of privacy protection that is similar to that in the H2H needs to be solved.

The ETSI M2M uses a resource-based Restful style. Service capability layers (SCL) of a device, a gateway, and a service management entity may all manage resources on the SCLs. This belongs to a distributed resource management system. In other words, in an existing M2M system architecture, no center entity that is similar to the PPR or GMLC in the H2H is to implement a privacy protection function.

Based on the existing M2M system architecture, in the ETSI M2M, an access right function is introduced, which forms an M2M system architecture shown in FIG. 1-b. However, many devices exist in an M2M system and not every device has a user interface (UI). Therefore, privacy notification or authentication cannot be directly performed on each M2M device like privacy notification or authentication is performed on UEs (all these UEs have user interfaces, for example, displays of mobile phones) in the 3GPP. That is to say, for a situation in which one user has multiple devices in the M2M system (for example, the user has MEM device A and device B), it is assumed that device A has a UI whereas device B has no UI, privacy notification or authentication may be performed on device A. For privacy protection for device B, although an access right function is introduced, device A still needs to be found through an mId interface first, and then privacy notification or authentication is performed on device B. In another aspect, even if a 3GPP locating function may be used through an NTOE interface, essentially, when the access right function, that is, a distributed access authentication function, is used to process a privacy protection mechanism, device B also needs to be found through the mId interface first. After an SCL of device B processes received information, if it is found that the 3GPP locating function needs to be used to locate device B, the 3GPP locating is used through the mId interface.

An underlying network of the mId interface may be a wired network, and may also be a wireless network. Therefore, a manner of finding device A through the mId interface first and then performing privacy notification or authentication for device B or a manner of finding device B through the mId interface first and then using the 3GPP to locate device B in the prior art may bring an additional signaling overhead. The unnecessary signaling overhead may cause network overload and occupy a normal data channel, thereby causing loss of operator's costs. For a wireless network with an air interface, a signaling overhead problem is more severe.

SUMMARY OF THE INVENTION

Embodiments of the present invention provide a machine-to-machine communications privacy protection method and system, a machine-to-machine communications service management entity, and a related device, so as to implement privacy protection for M2M and to reduce a signaling overhead at the same time.

An embodiment of the present invention provides a machine-to-machine communications privacy protection method, including: after receiving a location access message, determining, by a service management entity and according to locating information, an entity that performs privacy inspection; and triggering, by the service management entity, the entity that performs privacy inspection to perform privacy inspection.

An embodiment of the present invention provides a machine-to-machine communications privacy protection method, including: receiving, by a machine-to-machine communications M2M device, a location access message or a privacy inspection request, where the location access message or the privacy inspection request is sent by a service management entity; and returning, by the M2M device, an authentication response for privacy inspection to the service management entity.

An embodiment of the present invention provides a machine-to-machine communications privacy protection method, including: converting, by a service management entity, a received location access message into locating signaling that is identifiable for a 3rd-Generation Partnership Project 3GPP network element or privacy profile register PPR; and acquiring location information of an M2M device by interacting with the 3GPP network element or privacy profile register PPR.

An embodiment of the present invention provides a machine-to-machine communications service management entity, including: a determining module, configured to, in response to receiving a location access message, determine, according to locating information, an entity that performs privacy inspection; and a triggering module, configured to trigger the entity that performs privacy inspection to perform privacy inspection.

An embodiment of the present invention provides a machine-to-machine communications device, including: a receiving module, configured to receive a location access message or a privacy inspection request, where the location access message or the privacy inspection request is sent by a service management entity; and a returning module, configured to return an authentication response for privacy inspection to the service management entity.

An embodiment of the present invention provides a communications service management entity, including: a converting module, configured to convert a received location access message into locating signaling that is identifiable for a 3rd-Generation Partnership Project 3GPP network element or privacy profile register PPR; and an acquiring module, configured to acquire location information of an M2M device by interacting with the 3GPP network element or privacy profile register PPR.

An embodiment of the present invention provides a machine-to-machine communications privacy protection system, including: a machine-to-machine communications service management entity and a machine-to-machine communications device; where the machine-to-machine communications service management entity is configured to, after receiving a location access message, determine, according to locating information, an entity that performs privacy inspection, and trigger the entity that performs privacy inspection to perform privacy inspection; and the machine-to-machine communications device is configured to receive a location access message or a privacy inspection request, where the location access message or the privacy inspection request is sent by the machine-to-machine communications service management entity, and return an authentication response for privacy inspection to the machine-to-machine communications service management entity.

An embodiment of the present invention provides a machine-to-machine communications privacy protection system, including: a machine-to-machine communications service management entity and a 3rd-Generation Partnership Project location server; where the machine-to-machine communications service management entity is configured to, after receiving a location access message, determine, according to locating information, an entity that performs privacy inspection, and trigger the entity that performs privacy inspection to perform privacy inspection; and the 3rd-Generation Partnership Project location server is configured to receive an LCS service request sent by the machine-to-machine communications service management entity, and perform the privacy inspection.

An embodiment of the present invention provides a machine-to-machine communications privacy protection system, including: a machine-to-machine communications service management entity and a network element or privacy profile register on a 3rd-Generation Partnership Project network, where the machine-to-machine communications service management entity includes a converting module and an acquiring module; where the converting module is configured to convert a received location access message into locating signaling that is identifiable for the network element or privacy profile register on the 3rd-Generation Partnership Project network;

the acquiring module is configured to acquire location information of a machine-to-machine communications device by interacting with the network element or privacy profile register on the 3rd-Generation Partnership Project network; and the network element or privacy profile register on the 3rd-Generation Partnership Project network is configured to acquire the location information of the machine-to-machine communications device and provide the location information of the machine-to-machine communications device for the machine-to-machine communications service management entity.

It can be seen from the embodiments of the present invention that, the M2M service management entity determines in advance the entity that performs privacy inspection and triggers the entity that performs privacy inspection to perform privacy inspection. Therefore, with the methods provided in the embodiments of the present invention, message interaction on an mId interface is reduced, thereby reducing a message overhead. In this way, a network load is reduced, and especially for a wireless network with an air interface, benefit that reduction of a signaling overhead brings is greater. At the same time, a privacy protection function and locating procedure of the 3GPP location server is utilized fully, which reduces complexity of a platform.

BRIEF DESCRIPTION OF THE DRAWINGS

To describe the technical solutions in the embodiments of the present invention more clearly, the accompanying drawings required for describing the embodiments or the prior art are introduced briefly in the following. Apparently, the accompanying drawings in the following description are only some embodiments of the present invention, and persons skilled in the art may also derive other accompanying drawings from these accompanying drawings without creative efforts.

FIG. 1-a is a schematic diagram of a typical M2M system architecture in the prior art;

FIG. 1-b is a schematic diagram of an M2M system architecture after the ETSI M2M introduces an access right function;

FIG. 3-a is a schematic flow chart of a machine-to-machine communications privacy protection method according to another embodiment of the present invention;

FIG. 3-b is a schematic structural diagram of a privacy setting resource according to an embodiment of the present invention;

DETAILED DESCRIPTION OF THE EMBODIMENTS

The technical solutions in the embodiments of the present invention are clearly and completely described in the following with reference to the accompanying drawings in the embodiments of the present invention. Apparently, the embodiments to be described are only a part rather than all of the embodiments of the present invention. Based on the embodiments of the present invention, all other embodiments obtained by persons skilled in the art shall fall within the protection scope of the present invention.

Figure 2:
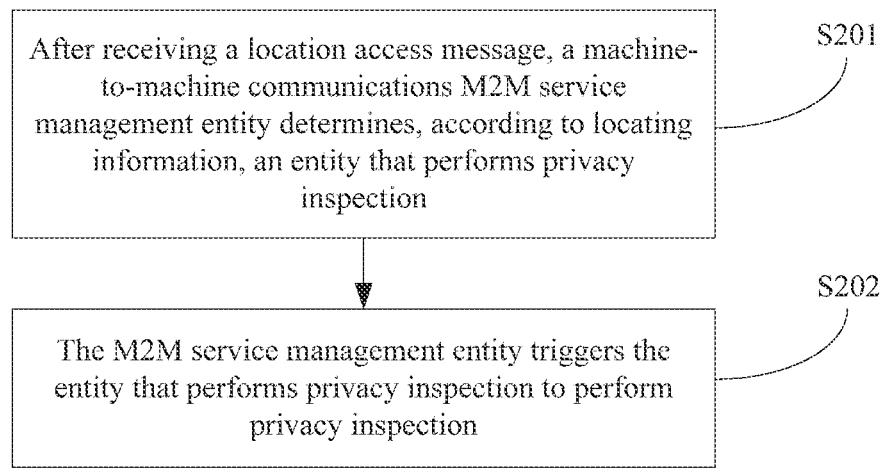
FIG. 2 is a schematic flow chart of a machine-to-machine communications privacy protection method according to an embodiment of the present invention.

FIG. 2 is a schematic flow chart of a machine-to-machine communications privacy protection method according to an embodiment of the present invention, where the method mainly includes the following steps:

S201: After receiving a location access message, a machine-to-machine communications M2M service management entity determines, according to locating information, an entity that performs privacy inspection. where the location access message refers to a message for acquiring, deleting, creating, or updating a location resource in a service management entity or an M2M device, or a message for subscribing to or unsubscribing to a location resource.

It should be noted that a function of the service management entity in the present invention may also be implemented by a platform or a middleware. Moreover, the M2M service management entity (SCL) may be located in a platform, a gateway, or some M2M devices.

In this embodiment of the present invention, the machine-to-machine communications M2M service management entity is located at the same place as an M2M service management entity in an M2M system architecture shown in FIG. 1-a, and may provide a service capability for various M2M applications (for example, electricity metering and intelligent traffic), thereby acquiring data collected by an M2M device or remotely controlling and managing an M2M device. A location acquiring command may be initiated by an M2M application through a locating application programming interface (API) of an mIa interface, for example, a locating API function may be Retrieve (URI of location resource, parameters (deviceId)).

It should be noted that in this embodiment of the present invention, a "user" refers to a user to which a device (including an M2M device without a user interface or a user equipment with a user interface) belongs. A user equipment with a user interface may also be called a "Notified device" in this embodiment of the present invention. This user equipment with a user interface may not be an M2M device but supports a notification and authentication manner such as a short message or a multimedia message. This user equipment with a user interface may also be an M2M device and supports a URI-based resource access manner and a notification and authentication manner such as a short message or a multimedia message. This user equipment with a user interface receives information, for example, a notification/authentication request, sent by the M2M service management entity. Information returned by this user equipment with a user interface is a response of a user to the information sent by the M2M service management entity, for example, allowing location acquiring and locating for an M2M device that belongs to the user.

In this embodiment of the present invention, the determining the entity that performs privacy inspection includes the following cases:

A first case may be that a user configures or sets locating information that includes privacy setting information onto an M2M service management entity by using an M2M application, where the privacy setting information indicates whether privacy inspection is performed on the M2M service management entity, an M2M device, or a 3GPP location server. After receiving a location acquiring command, the M2M service management entity may acquire the privacy setting information, and determine, according to the "privacy setting information", whether the privacy inspection is performed on the M2M service management entity (for example, integrating a function of the 3GPP location server), the M2M device, or the 3GPP location server (separated from the M2M service management entity).

A second case may be that the user does not configure or set the privacy setting information in the first case onto the M2M service management entity. After receiving a location acquiring command, to reduce a message overhead and delay, the M2M service management entity determines, by analyzing locating information that includes privacy setting information such as a notification and authentication manner, whether privacy inspection is performed on the M2M service management entity (for example, integrating the 3GPP location server), the M2M device, or the 3GPP location server (separated from the M2M service management entity). For example, if the M2M service management entity finds, by analyzing the privacy setting information in the locating information, that a notification/authentication request needs to be sent to a user equipment (Notified device), it is determined that the privacy inspection is performed on the M2M service management entity; otherwise, it is determined that the privacy inspection is performed on the M2M device; and for another example, if a third party that initiates a location acquiring command requests that only existing location information of the M2M device be obtained and does not need to locate the M2M device in real time, it may be determined that the privacy inspection is performed on the M2M service management entity. In this way, a message overhead and delay can also be reduced.

For another example, by analyzing locating type information in the locating information, if the location information is acquired by using a location server, for example, a 3GPP network element GMLC, the M2M service management entity may determine, according to device locating type information collected previously or device locating type information requested from a device after location access information is received, that the privacy inspection is performed on the M2M service management entity or the location server.

If the location information is acquired through a device domain equipped with, for example, a GPS or a WSN for locating, the service management entity may determine, according to device locating type information collected previously or device locating type information requested from the M2M device after the location acquiring command is received, that the privacy inspection is performed on the M2M device. Further, the M2M service management entity may know, according to device locating capability information collected previously or device locating capability information requested from the M2M device after the location acquiring command is received, that in WSN locating, a reference node or a gateway device performs a locating operation and obtains location information of the M2M device. In this case, the M2M device in the figure may be the reference node or the gateway device, that is, the privacy inspection may be performed on the M2M device. The location information here may be accurate location information, for example, longitude, latitude, and altitude, and may be fuzzy location information, for example, a city, road, residential community, and room number, and may also be relative location information, for example, a distance to the gateway or the reference node in the WSN.

S202: The M2M service management entity triggers the entity that performs privacy inspection to perform privacy inspection.

The privacy inspection refers to that the entity that performs privacy inspection determines whether a third party that initiates a location acquiring command through an M2M application has permission to access a location resource of the M2M device and/or locate the M2M device.

In an embodiment of the present invention, it may be determined, according to locating information, that an entity that performs privacy inspection is the M2M service management entity, and it may also be determined, according to the locating information, that the entity that performs privacy inspection is the M2M device. In this case, the M2M service management entity triggers the entity that performs privacy inspection to perform the privacy inspection, which may specifically be triggering the privacy inspection in a Restful resource access manner or through interaction of signaling, for example, SIP signaling or private internal signaling.

In this embodiment, the M2M service management entity has a privacy inspection function. After the privacy inspection is completed and locating is allowed, the M2M service management entity may send an LCS service request to a 3GPP location server through an Le interface (an interface between an LCS client and the 3GPP location server) to process the privacy protection and locating process at a 3GPP side. Moreover, in this embodiment, the M2M service management entity integrates a function of a location server, for example, a 3GPP location server GMLC. Therefore, after the privacy inspection is completed and locating is allowed, the M2M service management entity may send an LCS service request to a 3GPP network element through an Lg/SLg interface (an interface between the 3GPP location server and the 3GPP network element) to process a locating procedure.

In another embodiment of the present invention, if it is determined, according to the locating information, that the entity that performs privacy inspection is the M2M device, the M2M service management entity triggers the entity that performs privacy inspection to perform the privacy inspection, which includes: The M2M service management entity sends a privacy inspection request or a location acquiring command to the M2M device, and the M2M service management entity receives a response from the M2M device.

In another embodiment of the present invention, if it is determined, according to the locating information, that the entity that performs privacy inspection is a 3rd-Generation Partnership Project 3GPP location server, the M2M service management entity triggers the entity that performs privacy inspection to perform the privacy inspection, which includes: The M2M service management entity sends an LCS service request to the 3GPP location server, and the 3GPP location server performs the privacy inspection. In this case, if the 3GPP location server does not have a privacy inspection function, the 3GPP location server interacts with a PPR through an Lpp interface, and the PPR performs the privacy inspection. In this embodiment, the M2M service management entity sends an LCS service request into which a location access message is converted to the 3GPP location server, which may be: The M2M service management entity sends the LCS service request to the 3GPP location server through the Le interface (the interface between the LCS client and the 3GPP location server), and the location server sends the LCS service request to the 3GPP network element to perform the locating procedure.

It can be seen from the preceding embodiment of the present invention that, the M2M service management entity determines in advance the entity that performs privacy inspection and triggers the entity that performs privacy inspection to perform privacy inspection. Therefore, with the method provided in this embodiment of the present invention, message interaction on an mId interface is reduced, thereby reducing a message overhead. In this way, a network load is reduced, and especially for a wireless network with an air interface, benefit that reduction of a signaling overhead brings is greater. At the same time, a privacy protection function and locating procedure of the 3GPP location server is utilized fully, which reduces complexity of a platform.

In addition to the preceding basic content, the M2M service management entity triggers the privacy inspection, which further includes: The M2M service management entity sends a notification request and/or an authentication request to a Notified device, the Notified device returns a notification or authentication response (the notification response is optional) after notification displaying and authentication are completed inside the Notified device, and the M2M service management entity receives a response to the notification request and/or the authentication request.

To reduce an overhead and improve locating efficiency or improve user experience, the M2M service management entity may send a combined notification to a user equipment according to privacy setting information, where the combined notification is used to notify that locating is to be performed on a group of M2M devices. That is, a group of devices of a user are all allowed to be located and the M2M service management entity combines these notifications sent to each of the M2M devices in the group into one notification message according to a group notification function that is enabled in privacy setting, and simultaneously sends the combined notification to the Notified device (that is, to the user) at a certain time point. The M2M service management entity may also send a combined authentication request to the user equipment according to the privacy setting information, where the combined authentication request is used to request that locating be performed on a group of M2M devices. Accordingly, the Notified device needs to return, for the combined notification, only one notification response of the user and return, for the combined authentication request, one authentication response of the user. If the authentication response is that the M2M device is allowed to be located, this is a function of associating devices of the same type provided in this embodiment of the present invention, that is, during authentication, after the Notified device allows a third party to locate a certain M2M device of the user, all M2M devices that are of the same type and are owned by the user may be subsequently located without a need of authentication, so as to reduce an overhead and improving user experience. The user may set the function of associating devices of the same type when setting the privacy setting information, and a platform enables, according to a subsequent authentication response of the user, the function of associating devices of the same type, so as to reduce an overhead of an authentication message for the user.

In an embodiment of the present invention, if it is determined, according to locating information, an entity that performs privacy inspection is an M2M service management entity, when a result of the privacy inspection is that the M2M device is allowed to be located, the M2M service management entity sends an LCS service request to a 3rd-Generation Partnership Project 3GPP network element and receives an LCS service response of the 3GPP network element; or the M2M service management entity sends an LCS service request to a 3rd-Generation Partnership Project 3GPP network element and receives a locating result of locating the M2M device from the 3rd-Generation Partnership Project 3GPP network element; or the M2M service management entity sends an LCS service request to the M2M device and receives a locating result of locating the M2M device from the M2M device.

The 3GPP network element also has a privacy inspection function. Therefore, if privacy inspection has been performed on the M2M service management entity, when the M2M service management entity sends the LCS service request to the 3GPP network element, the 3GPP network element may probably perform privacy inspection again. However, the privacy inspection performed again by the 3GPP network element is not mandatory, and this repeated privacy inspection usually causes bad user experience. In this embodiment of the present invention, the LCS service request sent by the M2M service management entity to the 3rd-Generation Partnership Project 3GPP network element may include a locating identifier of the M2M service management entity, where the locating identifier is used to instruct the 3GPP network element to avoid privacy inspection that is to be performed again, or the LCS service request sent by the M2M service management entity to the 3rd-Generation Partnership Project 3GPP network element may include an identifier that is used to indicate that the M2M service management entity has performed the privacy inspection, for example, an identifier that is added by modifying an existing Le interface and indicates that the privacy inspection has been performed on an M2M platform. A 3GPP privacy profile register or GMLC determines whether the privacy inspection needs to be continued, that is, a locating type needs to be added for 3GPP privacy data, and the 3GPP network element determines whether the privacy inspection needs to be performed again.

The M2M device is allowed to be located in different areas, that is, different areas where locating is allowed may be flexibly configured in advance according to different requirements of the third party, for example, allowing a colleague of a user to locate the user or a car of the user in a company where the user works, allowing a friend of a user to locate the user or a car of the user around a place of entertainment, or allowing a family member of a user to locate the user or a car of the user in all areas outside a company.

In another embodiment of the present invention, if it is determined, according to the locating information, the entity that performs privacy inspection is an M2M device, after the M2M service management entity sends a privacy inspection request or a location acquiring command to the M2M device, the method further includes: The M2M service management entity receives a locating result of locating the M2M device, or the M2M service management entity receives a result of privacy inspection that is performed by the M2M device.

In this embodiment of the present invention, the result of the privacy inspection mainly includes: The M2M device is allowed to be located; the M2M device is not allowed to be located; the M2M device is allowed to be located and a notification is sent to a user equipment; a notification is sent to a user equipment, and authentication of the user equipment is required, but locating is allowed when no response is returned; and a notification is sent to a user equipment and locating is allowed only after authentication of the user equipment is successful.

In an embodiment of the present invention where it is determined, according to locating information, an entity that performs privacy inspection is an M2M device or a 3rd-Generation Partnership Project 3GPP location server, the M2M service management entity triggers the entity that performs privacy inspection to perform privacy inspection, which further includes: The M2M service management entity sends a notification and/or authentication request to a user equipment or the M2M device, and the M2M service management entity receives an authentication response to the authentication request, where the authentication response includes information about whether the M2M device is allowed to be located.

To reduce an overhead and improve locating efficiency or improve user experience, in the embodiment where it is determined that the entity that performs privacy inspection is the M2M device or the 3rd-Generation Partnership Project 3GPP location server, the M2M service management entity may send a combined notification to the user equipment or the M2M device according to privacy setting information, where the combined notification is used to notify that locating is to be performed on a group of M2M devices. This is a function of associating a group of devices provided in this embodiment of the present invention, that is, a group of devices of a user are all allowed to be located and the M2M service management entity combines these notifications into one notification message according to a group notification function that is enabled in privacy setting, and simultaneously sends the notification message to a Notified device (that is, to the user) at a certain time point. The M2M service management entity may also send a combined authentication request to the user equipment or the M2M device according to the privacy setting information, where the combined authentication request is used to request that locating be performed on a group of M2M devices. Accordingly, the Notified device needs to return, for the combined notification, only one notification response of the user and return, for the combined authentication request, one authentication response of the user. If the authentication response is that the M2M device is allowed to be located, the authentication response may include that an M2M device of the same type as the M2M device is directly allowed to be located and a third party does not need to send an authentication request for authentication again. This is a function of associating devices of the same type provided in this embodiment of the present invention, that is, during authentication, after the Notified device allows a third party to locate a certain M2M device of the user, all M2M devices that are of the same type and are owned by the user may be subsequently located without a need of authentication, so as to reduce an overhead and improving user experience.

FIG. 3-a is a schematic flow chart of a machine-to-machine communications privacy protection method according to another embodiment of the present invention. In the embodiment shown in FIG. 3-a, based on the embodiment shown in FIG. 2, interaction of each device is described as follows:

S301: An M2M application sends a location access message to an M2M service management entity.

For example, by using an API function Retrieve (URI of location resource, parameters (deviceId)), the location access message is sent to the M2M service management entity through an mIa interface to acquire latest locating information or existing locating information of an M2M device.

S302: The M2M service management entity analyzes locating information.

In this embodiment of the present invention, the locating information includes the location access message. A main purpose of analyzing the locating information by the M2M service management entity is to determine whether privacy inspection is performed on the M2M service management entity, the M2M device, or a 3GPP location server. For a determining method, reference may specifically be made to a related part of step S201 shown in FIG. 2. In this embodiment, assume that it is determined that privacy inspection is performed on the M2M service management entity.

S303: The M2M service management entity performs privacy inspection.

The M2M service management entity performs the privacy inspection. A main basis for the inspection is user privacy that is set by a user by using the M2M application and a process that is similar to a create retrieve update delete (CRUD) process of an access right in the ETSI M2M standard through an interface such as a dIa interface and a mIa interface. For example, setting a contactUser subresource, a <Consumer> subresource, and an areaAllowed subresource, as shown in FIG. 3-b, is defining permission to access the location information in an <accessRight>/locPermissions subresource.

When setting a privacy configuration message by using the M2M application, the user specifies addressing information of a Notified device through the contactUser subresource, and may specifically configure a device number, an IP address, or a URI. When a third party initiates a location access message and needs to notify the user or instruct the user to perform authentication, a notification message or authentication message is sent to the Notified device by sending a short message/multimedia message to the userIdentity, by accessing a Notified device resource through a URI in a resource manner, or by using a configured IP address. After the Notified device receives the notification message or authentication message, the message is converted, in the device, into a message that may be processed on a UI for the user to use.

Setting of Attribute in the contactUser subresource is mainly defining the following attributes:

Association: a function of associating devices of the same type, which means that during authentication, after the contactUser allows an NA to locate a certain device of the user, all devices that are of the same type and are owned by the user may be subsequently located without authentication, so as to reduce an overhead and improving user experience.

Group: a function of associating a group of devices, which means that some devices of the user are all located by an application, but a privacy function combines these notifications of the user into one notification message according to whether a group notification function is enabled in privacy setting, and simultaneously sends the notifications to the user at a certain time point.

areaPermitted: area permitted privacy setting information. The area permitted privacy setting information is used to allow the M2M device to be located in different areas. The M2M service management entity may receive the area permitted privacy setting information. With regard to areaPermitted of the 3GPP, for one located device of the user, only one fixed area where locating is allowed can be set. In M2M, different areas where locating is allowed may be flexibly configured according to a network application (NA). A colleague of the user is allowed to locate the user or a car of the user in a company where the user works, a friend of the user is allowed to locate the user or a car of the user around a place of entertainment, or a family member of the user is allowed to locate the user or a car of the user in all areas outside a company.

It should be noted that privacy setting may also be performed through a private interface in addition to being configured by the user by using the M2M application through an interface such as a dIa interface and a mIa interface. In some cases, after a user signs a contract with an operator or an M2M service provider, privacy setting included in the contract may be configured into a privacy-related resource through a private interface.

S304: The M2M service management entity sends a notification request and/or an authentication request to a user equipment, where the user equipment may refer to a device with a user interface.

If the M2M service management entity finds, by analyzing the location access message, that the user needs to be notified and perform authentication, as described in the preceding, results of the notification and authentication of the user are returned by the user equipment (Notified device). Therefore, the M2M service management entity sends the notification request and/or authentication request to the Notified device.

S305: The user equipment returns a notification response or authentication response.

After notification displaying and authentication are completed inside the user equipment (Notified device), the user equipment (Notified device) returns the notification response or authentication response, where the notification response is optional.

S306: The M2M service management entity sends an LCS service request to a 3GPP location server.

It should be noted that, in this embodiment, the M2M service management entity integrates the 3GPP location server or a function of the 3GPP location server. Therefore, the M2M service management entity may also send the LCS service request to a 3GPP network element through an Lg/Slg interface (an interface between the 3GPP location server and the 3GPP network element).

S307: The 3GPP location server returns a locating result to the M2M service management entity.

In this embodiment of the present invention, for an M2M device that is located through an Le interface with the help of a 3GPP network element, a locating result of a user plane SUPL/control plane is acquired according to a 3GPP locating procedure, where a locating technology includes, for example, an OTDOA, CellID, AGPS, or global positioning system (GPS) technology. A 3GPP PPR or GMLC determines whether privacy inspection needs to be continued. The 3GPP network element provides the locating result for the 3GPP location server, and then the 3GPP location server returns the locating result to the M2M service management entity.

S308: The M2M service management entity returns the locating result to the M2M application.

Figure 4:
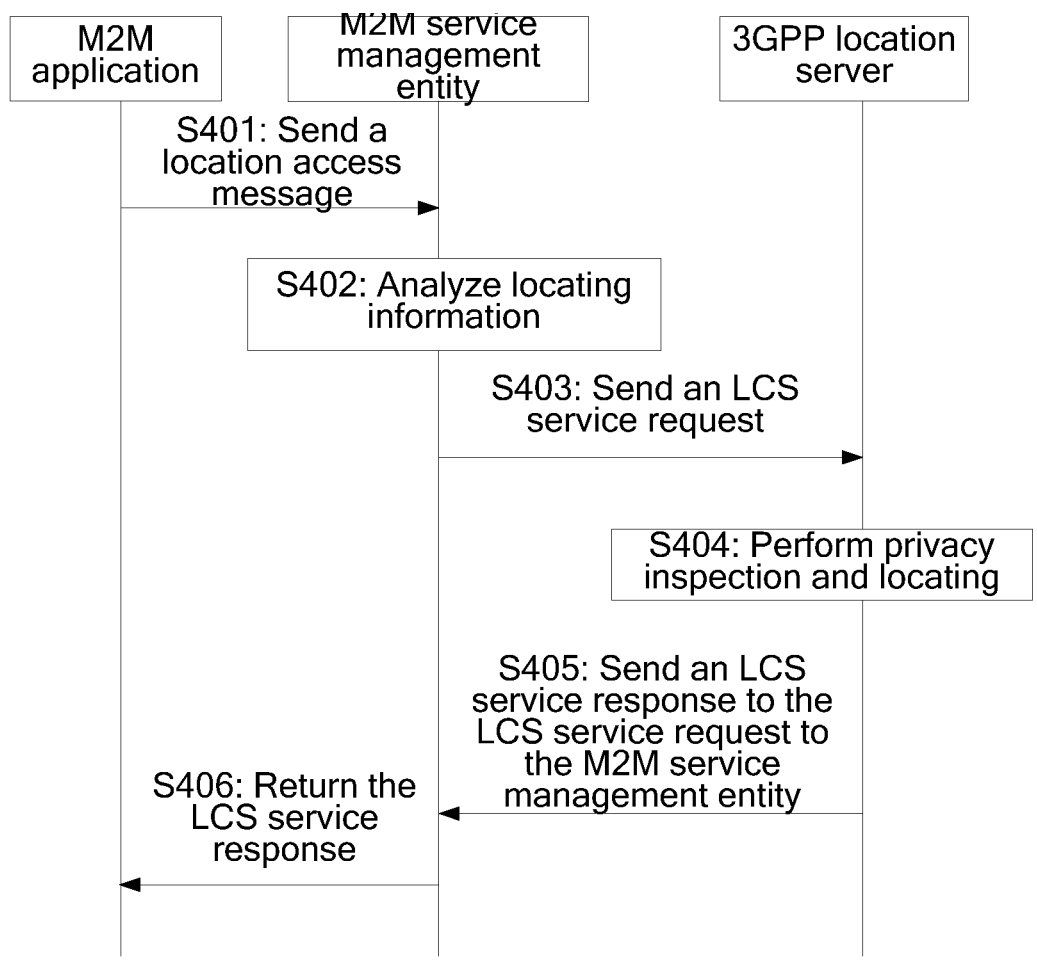
FIG. 4 is a schematic flow chart of a machine-to-machine communications privacy protection method according to another embodiment of the present invention.

FIG. 4 is a schematic flow chart of a machine-to-machine communications privacy protection method according to another embodiment of the present invention. In this embodiment, a 3GPP location server is separated from an M2M service management entity. In the embodiment shown in FIG. 4, based on the embodiment shown in FIG. 2, interaction of each device is described as follows:

S401: An M2M application sends a location access message to an M2M service management entity.

For example, by using an API function Retrieve (URI of location resource, parameters (deviceId)), the location access message is sent to the M2M service management entity through an mIa interface to acquire latest locating information or existing locating information of an M2M device.

S402: The M2M service management entity analyzes locating information.

In this embodiment of the present invention, the locating information includes the location access message. A main purpose of analyzing the locating information by the M2M service management entity is to determine whether privacy inspection is performed on a 3GPP location server or the M2M device. Assume that the M2M service management entity may determine, according to information in the location access message, for example, locating type information (that is, whether a 3GPP locating or another locating manner, for example, wsn locating, is adopted), that privacy inspection is performed on the 3GPP location server.

S403: The M2M service management entity sends an LCS service request to the 3GPP location server.

In this embodiment, the M2M service management entity sends the LCS service request to the 3GPP location server, which may be: The M2M service management entity sends the LCS service request to the 3GPP location server through an Le interface (an interface between an LCS client and the 3GPP location server), and the location server sends the LCS service request to a 3GPP network element. After receiving the LCS service request, the 3GPP location server performs privacy inspection (S404).

S405: The 3GPP location server sends an LCS service response of the LCS service request to the M2M service management entity.

If the 3GPP location server performs locating successfully, the LCS service response carries location information of the M2M device.

S406: The M2M service management entity returns the LCS service response to the M2M application.

Figure 5:
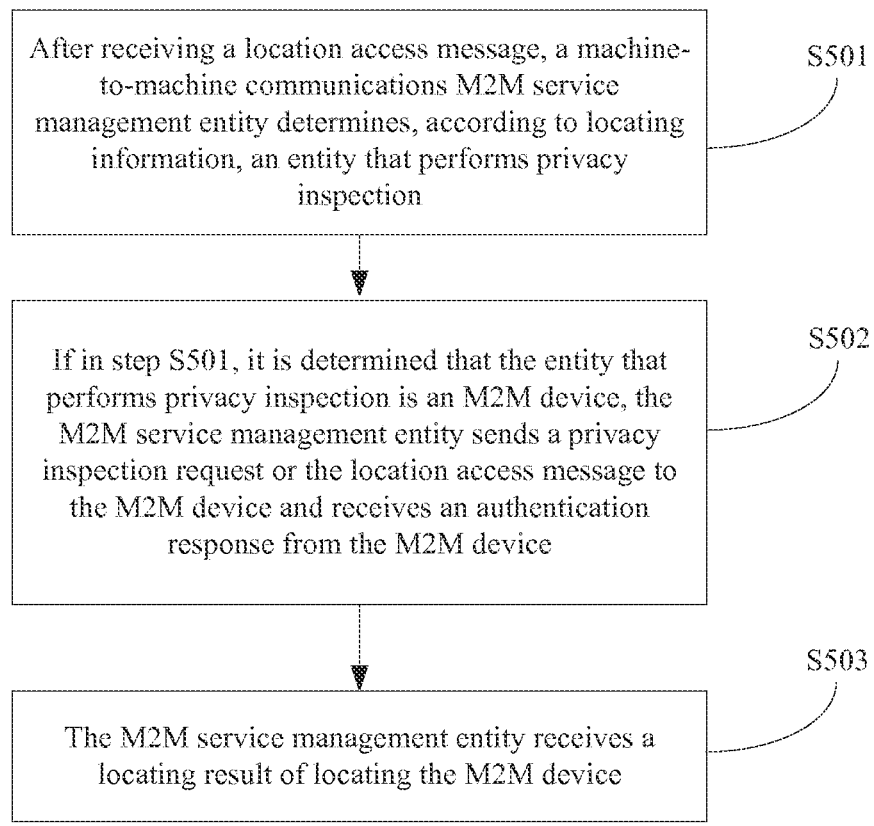
FIG. 5 is a schematic flow chart of a machine-to-machine communications privacy protection method according to another embodiment of the present invention.

FIG. 5 is a schematic flow chart of a machine-to-machine communications privacy protection method according to another embodiment of the present invention, where the method mainly includes the following steps:

S501: After receiving a location access message, a machine-to-machine communications M2M service management entity determines, according to locating information, an entity that performs privacy inspection.

It is determined that whether privacy inspection is performed on the M2M service management entity, a 3GPP location server, or an M2M device. For a specific determining method, reference may be made to a related part of step S201 in the embodiment shown in FIG. 2. For example, if location information is acquired through a device domain equipped with, for example, a WSN for locating, the M2M service management entity may determine, according to device locating capability information collected previously or device locating capability information requested from a device after the location access message is received, that the privacy inspection is performed on the M2M device. Further, the M2M service management entity may know, according to the device locating capability information collected previously or device locating capability information requested from the device after the location access message is received, that a locating operation is performed in a device domain with a device, for example, a reference node or a gateway device, and a location of a node in the location information may be obtained. In this case, the M2M device in the figure may be the reference node or the gateway device, that is, the privacy inspection may be performed on the M2M device.

S502: If in step S501, it is determined that the entity that performs privacy inspection is the M2M device, the M2M service management entity sends a privacy inspection request or the location access message to the M2M device and receives an authentication response from the M2M device.

Optionally, the M2M device further returns a notification response, and the M2M service management entity receives the notification response.

Optionally, the M2M device further returns a result of the privacy inspection that is performed by the M2M device, and the M2M service management entity receives the result of the privacy inspection that is performed by the M2M device, which mainly includes the following cases:

if the M2M service management entity needs to contact a location server so as to locate the M2M device in a subsequent locating process, the M2M device needs to return the result of the privacy inspection, for example, locating is allowed, to the M2M service management entity; and if the M2M service management entity performs parsing or conversion when receiving the location access message, for example, converting the location access message into a privacy inspection request message, and after authentication performed by the M2M device, a third party is not allowed to locate the M2M device, the M2M device needs to notify a result "a third party is not allowed to locate the M2M device" to the M2M service management entity, and then the M2M service management entity notifies an M2M application of a response.

In this embodiment of the present invention, the result of the privacy inspection includes any one or any combination of the following: The M2M device is allowed to be located; the M2M device is not allowed to be located; the M2M device is allowed to be located and a notification is sent to an M2M device with a user interface; a notification is sent to an M2M device with a user interface and the M2M device with a user interface needs to perform authentication; a notification is sent to an M2M device with a user interface and locating is allowed only after authentication performed by the M2M device with a user interface is successful, and so on.

S503: The M2M service management entity receives a locating result of locating the M2M device.

If the M2M service management entity sends a privacy inspection request to the M2M device, before the M2M service management entity receives the result of the privacy inspection that is performed by the M2M device, the method further includes: The M2M service management entity sends the location access message or an LCS service request to the M2M device. Specifically, if before the M2M service management entity receives the result of the privacy inspection that is performed by the M2M device, the M2M service management entity sends the location access message to the M2M device, and the M2M device itself implements a locating function, and therefore the M2M service management entity does not need to deliver the location access message again; and if before the M2M service management entity receives the result of the privacy inspection that is performed by the M2M device, the M2M service management entity sends the privacy inspection request to the M2M device, the location access message or the LCS service request needs to be sent to the M2M device. Whether the location access message is delivered or the LCS service request is delivered is determined according to whether the M2M service management entity parses and converts a request of the M2M application.

Figure 6:
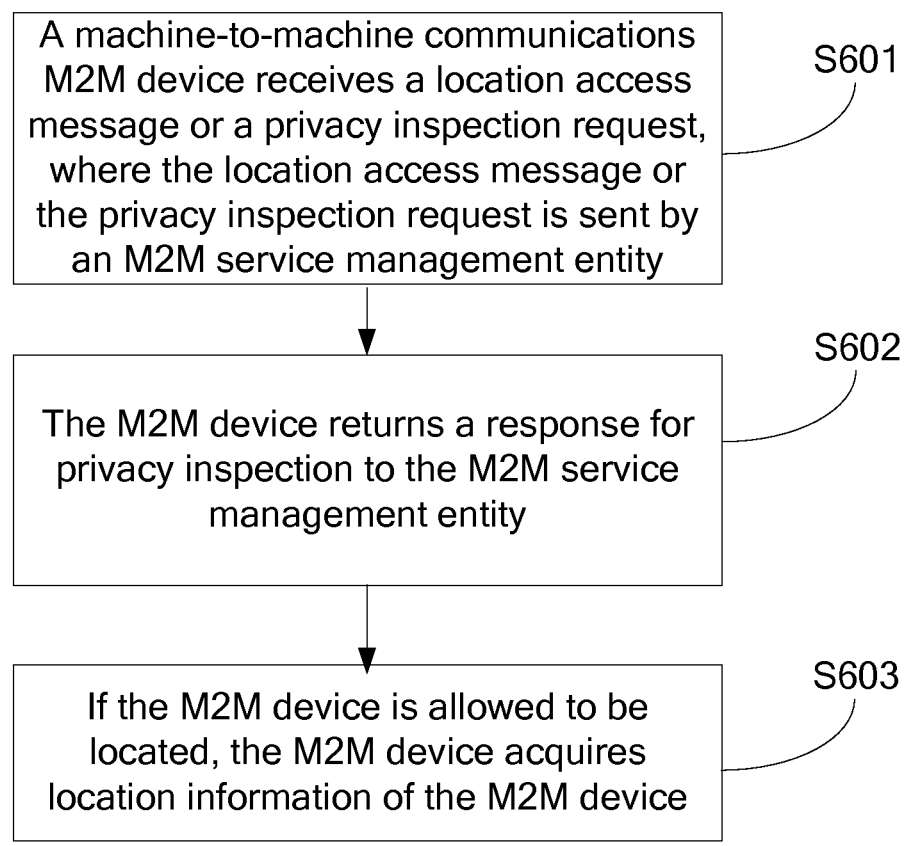
FIG. 6 is a schematic flow chart of a machine-to-machine communications privacy protection method according to another embodiment of the present invention.

FIG. 6 is a schematic flow chart of a machine-to-machine communications privacy protection method according to another embodiment of the present invention, where the method mainly includes the following steps:

S601: A machine-to-machine communications M2M device receives a location access message or a privacy inspection request, where the location access message or the privacy inspection request is sent by an M2M service management entity.

In this embodiment, the location access message or the privacy inspection request received by the machine-to-machine communications M2M device is sent when the M2M service management entity determines that privacy inspection is performed on the M2M device.

S602: The M2M device returns a response for privacy inspection to the M2M service management entity.

The response for privacy inspection may be, for example, allowing a third party to locate the M2M device; and optionally, the M2M device further returns a notification response.

Optionally, the M2M device returns an authentication response for privacy inspection to the M2M service management entity, which further includes: The M2M device returns a result of performing privacy inspection to the M2M service management entity.

To reduce an overhead or improve user experience, the M2M device needs to return, for a combined notification, only one notification response of a user and return, for a combined authentication request, one authentication response of the user. If the authentication response is that the M2M device is allowed to be located, the authentication response may include that an M2M device of the same type as the M2M device is directly allowed to be located and a third party does not need to send an authentication request for authentication again. This is a function of associating devices of the same type provided in this embodiment of the present invention, that is, during authentication, after a Notified device allows a third party to locate a certain M2M device of the user, all M2M devices that are of the same type and are owned by the user may be subsequently located without a need of authentication, so as to reduce an overhead and improving user experience.

In this embodiment of the present invention, the result of the privacy inspection includes any one or any combination of the following: The M2M device is allowed to be located; the M2M device is not allowed to be located; the M2M device is allowed to be located and a notification is sent to an M2M device with a user interface; a notification is sent to an M2M device with a user interface and the M2M device with a user interface needs to perform authentication; a notification is sent to an M2M device with a user interface and locating is allowed only after authentication performed by the M2M device with a user interface is successful, and so on.

S603: If the M2M device is allowed to be located, the M2M device acquires location information of the M2M device.

In this embodiment, the M2M device acquires the location information of the M2M device, which includes: The M2M device acquires the location information of the M2M device by using its own global positioning system (GPS), the M2M device acquires the location information of the M2M device from a 3GPP core network element, or the M2M device acquires the location information of the M2M device through a WSN. Specifically, for a device whose location information is acquired in a device domain of the M2M device, a locating result is acquired according to a WSN locating procedure, where a locating technology includes RSSI, TOA, TDOA, AOA, or a locating technology that is based on the number of hops and connectivity rather than ranging.

Further, if a reference node or a gateway device performs a locating procedure, the reference node or the gateway device needs to create, in a Restful resource access manner, a location resource on the M2M device to store the location information, or specify, through an announce resource, a URI of a place where the location information is located. Alternatively, the M2M service management entity maintains a URI of the reference node and directly acquires the location information from a location resource of the reference node when receiving a location access message from an NA. For example, the device gateway or a certain reference node on a WSN has a GPS function, and on a small-scale WSN, another M2M device may use location information acquired by the GPS as its own location information.

If a located M2M device, the reference node, or the gateway device is connected to the 3GPP, a device location may be acquired through a location request initiated by a 3GPP mobile terminal in a (Mobile Originated Location Request, MO-LR) procedure (this procedure does not involve privacy inspection in the 3GPP). To further ensure privacy, an M2M application identifier indicating that the M2M application as a third party initiates locating needs to be carried when the located M2M device or the reference node initiates an LCS service request.

Figure 7:
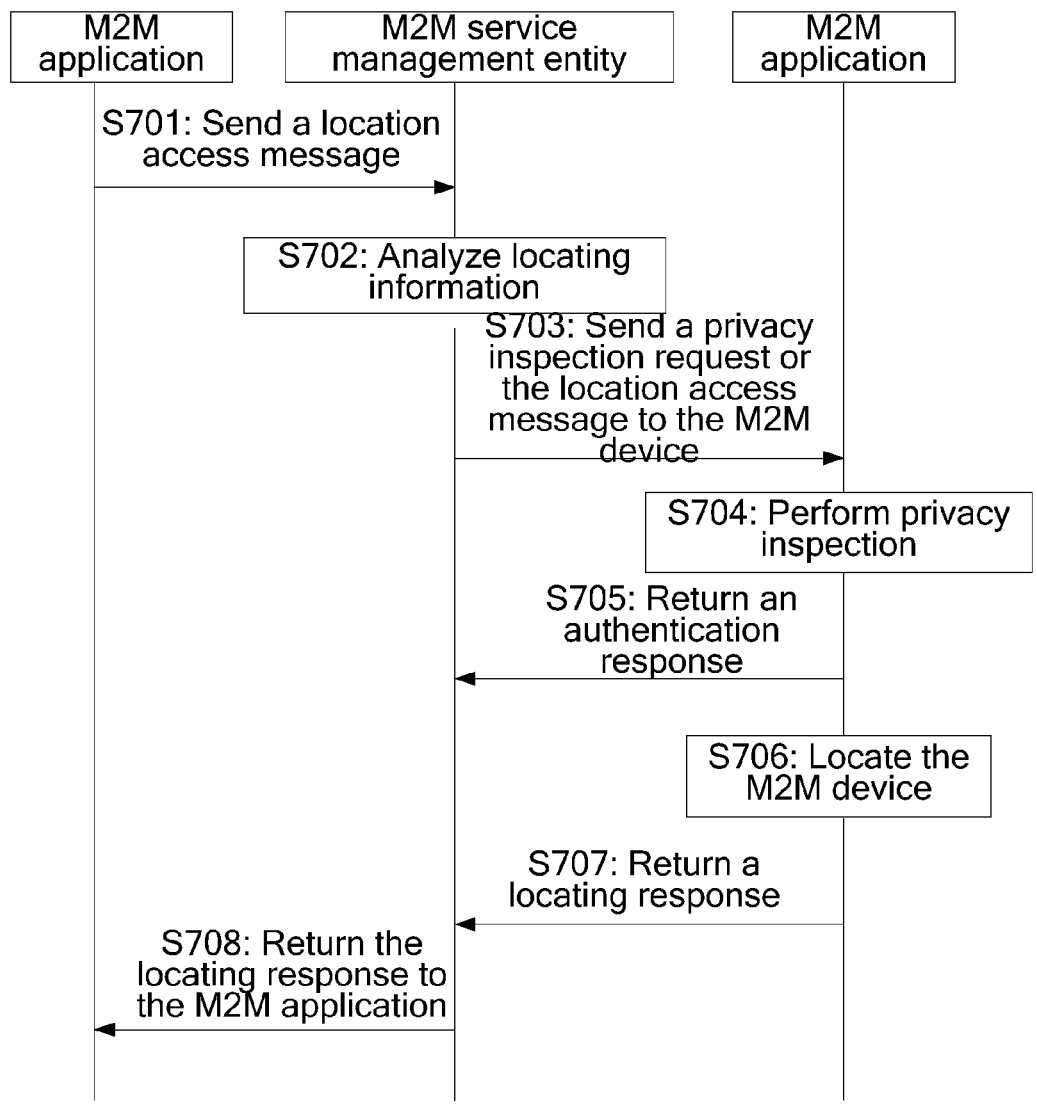
FIG. 7 is a schematic flow chart of a machine-to-machine communications privacy protection method according to another embodiment of the present invention.

FIG. 7 is a schematic flow chart of a machine-to-machine communications privacy protection method according to another embodiment of the present invention. In the embodiment shown in FIG. 7, based on the embodiments shown in FIG. 5 and FIG. 6, interaction of each device is described as follows:

S701: An M2M application sends a location access message to an M2M service management entity.

For example, by using an API function Retrieve (URI of location resource, parameters (deviceId)), the location access message is sent to the M2M service management entity through an mIa interface to acquire latest locating information or existing locating information of an M2M device.

S702: The M2M service management entity analyzes a locating message.

In this embodiment of the present invention, the locating message includes the location access message. A main purpose of analyzing the locating message by the M2M service management entity is to determine whether privacy inspection is performed on the M2M service management entity, a 3GPP location server, or the M2M device. For a determining method, reference may specifically be made to a related part of step S201 shown in FIG. 2. In this embodiment, assume that it is determined that privacy inspection is performed on the M2M device.

S703: The M2M service management entity sends a privacy inspection request or the location access message to the M2M device.

S704: The M2M device performs privacy inspection.

S705: The M2M device returns an authentication response to the M2M service management entity.

The authentication response returned by the M2M device is an authentication response for the privacy inspection, for example, it may be: allowing a third party to locate the M2M device. Optionally, the M2M device further returns a notification response; and optionally, the M2M device further returns a result of the privacy inspection that is performed by the M2M device, and the M2M service management entity receives the result of the privacy inspection that is performed by the M2M device.

S706: The M2M device locates the M2M device.

If the result of the privacy inspection is yes, for example, the M2M device is allowed to be located, the M2M device acquires location information of the M2M device.

S707: The M2M device returns a locating response to the M2M service management entity.

If the location information of the M2M device is acquired, the returned locating response includes acquired location information.

S708: The M2M service management entity returns the locating response to the M2M application.

If the M2M device acquires the location information of the M2M device, the locating response returned by the M2M service management entity includes the acquired location information of the M2M device.

Figure 8:
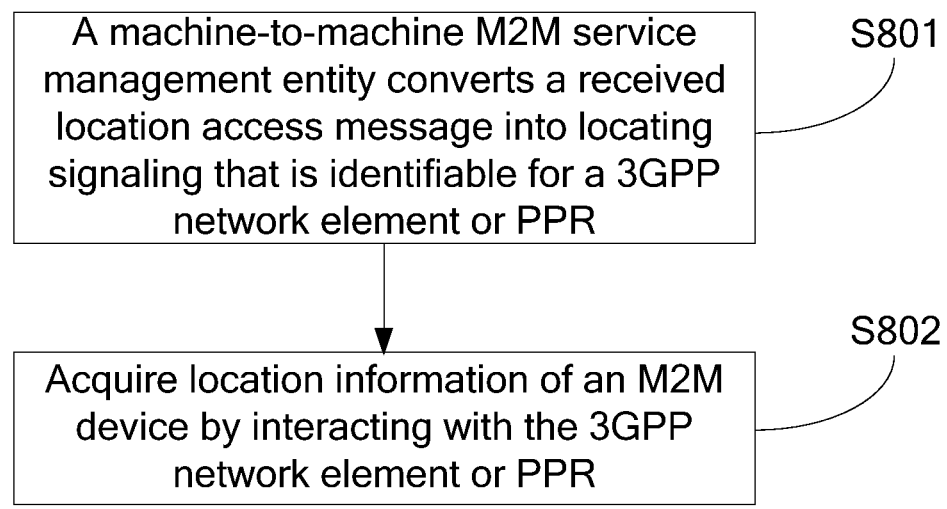
FIG. 8 is a schematic flow chart of a machine-to-machine communications privacy protection method according to another embodiment of the present invention.

FIG. 8 is a schematic flow chart of a machine-to-machine communications privacy protection method according to another embodiment of the present invention, where the method mainly includes the following steps:

S801: A machine-to-machine M2M service management entity converts a received location access message into locating signaling that is identifiable for a 3GPP network element or PPR.

In a case in which many M2M devices access the 3GPP in an M2M system and locating needs to be performed through a 3GPP locating function, the M2M service management entity introduces a privacy protection function owned by a GMLC and an external LCS client, that is, converting a location access message sent by an M2M application through an mIa interface into core-network locating signaling that is identifiable for the 3GPP. The mIa interface also supports provisioning on the external LCS client to configure privacy-related data that includes a privacy class. In addition, privacy configuration may also be implemented through a private interface.

S802: Interact with the 3GPP network element or PPR to acquire location information of an M2M device.

In this embodiment, the M2M service management entity has an Lg interface and may be connected to the 3GPP to reuse a locating capability of the 3GPP network element; has a privacy inspection function and reuses a function of an existing GMLC; and supports an Lpp interface to exchange a privacy inspection message with the PPR and may support multiple Lpp interfaces.

Figure 9:
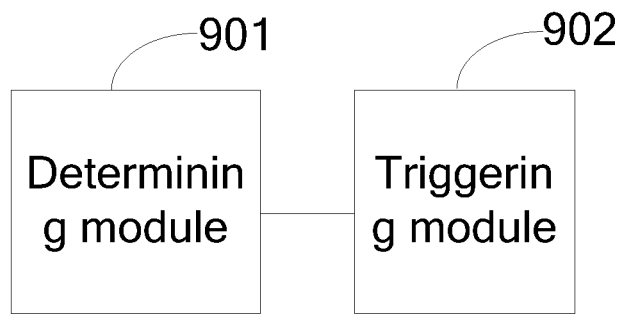
FIG. 9 is a schematic diagram of a logical structure of a machine-to-machine communications service management entity according to an embodiment of the present invention.

FIG. 9 is a schematic diagram of a logical structure of a machine-to-machine communications service management entity according to an embodiment of the present invention. To facilitate the description, only a part related to the embodiment of the present invention is illustrated. In this embodiment of the present invention, the M2M service management entity is located at the same place as an M2M service management entity in an M2M system architecture shown in FIG. 1-a, and may provide a service capability for various M2M applications (for example, electricity metering and intelligent traffic), thereby acquiring data collected by an M2M device or remotely controlling and managing an M2M device. An included functional module/unit may be a software module/unit, a hardware module/unit, or a combination of a software module/unit and a hardware module/unit, and a determining module 901 and a triggering module 902 are included, where:

the determining module 901 is configured to, after receiving a location access message, determine, according to locating information, an entity that performs privacy inspection; and the triggering module 902 is configured to trigger the entity that performs privacy inspection o perform privacy inspection, where the entity that performs privacy inspection is determined by the determining module 901.

Figure 10:
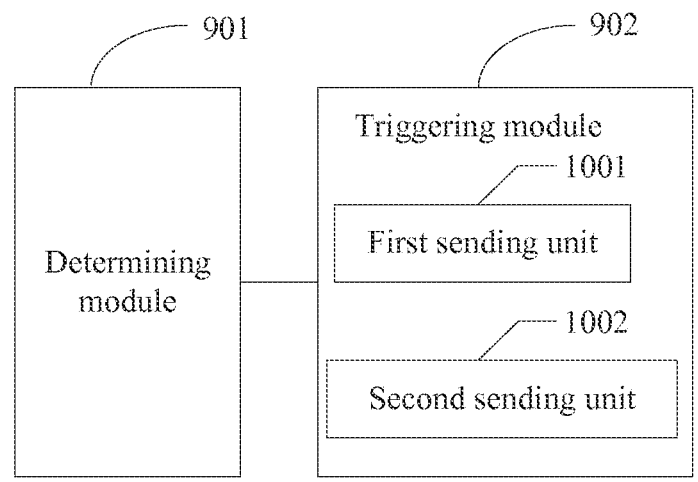
FIG. 10 is a schematic diagram of a logical structure of a machine-to-machine communications service management entity according to another embodiment of the present invention.
Figure 11:
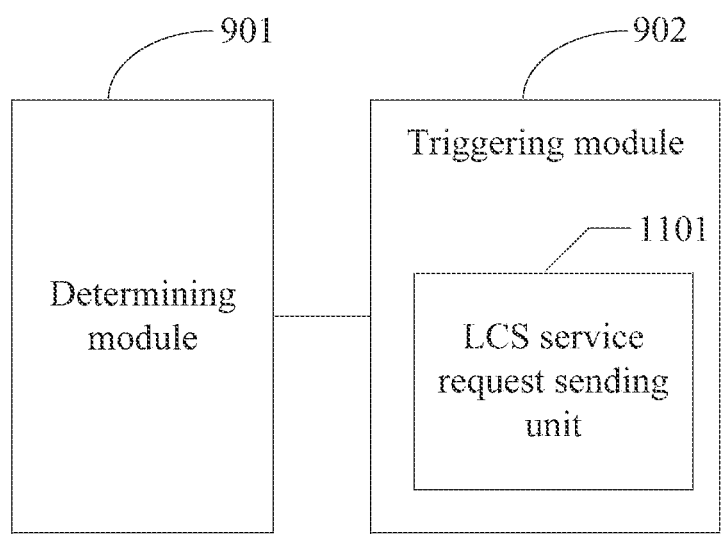
FIG. 11 is a schematic diagram of a logical structure of a machine-to-machine communications service management entity according to another embodiment of the present invention.

Specifically, if the determining module 901 determines, according to the locating information, that the entity that performs privacy inspection is the M2M service management entity, the triggering module 902 triggers the M2M service management entity to perform the privacy inspection. If the determining module 901 determines, according to the locating information, that the entity that performs privacy inspection is the M2M device, the triggering module 902 includes a first sending unit 1001 and a first receiving unit 1002. As shown in FIG. 10, another embodiment of the present invention provides a machine-to-machine communications service management entity, where the first sending unit 1001 is configured to send a privacy inspection request or the location access message to the M2M device, and the first receiving unit 1002 is configured to receive a response of the M2M device. If the determining module 901 determines, according to the locating information, that the entity that performs privacy inspection is a 3rd-Generation Partnership Project 3GPP location server, the triggering module 902 includes an LCS service request sending unit 1101. As shown in FIG. 11, another embodiment of the present invention provides a machine-to-machine communications service management entity, where the LCS service request sending unit 1101 is configured to send an LCS service request to the 3GPP location server, and the 3GPP location server performs the privacy inspection.

It should be noted that, in the preceding embodiment of the machine-to-machine communications service management entity, division of each functional module is only for illustration. In an actual application, the preceding functions may be implemented by different functional modules according to a requirement, for example, a configuration requirement of corresponding hardware or a consideration for convenience of software implementation. That is, an internal structure of the machine-to-machine communications service management entity is divided into different functional modules to implement all or part of functions described in the preceding. Furthermore, in an actual application, corresponding functional modules in this embodiment may be implemented by corresponding hardware, and may also be accomplished by corresponding hardware executing corresponding software. For example, the determining module may be hardware, for example, a determining device, which determines, according to the locating information, after receiving the location access message, the entity that performs privacy inspection, and may also be a general processor or another hardware device that is capable of executing a corresponding computer program to implement the preceding function. For another example, the triggering module may be hardware, for example, a trigger, which performs a function of triggering the entity that performs privacy inspection to perform privacy inspection, and may also be a general processor or another hardware device that is capable of executing a corresponding computer program to implement the preceding function.

Figure 12:
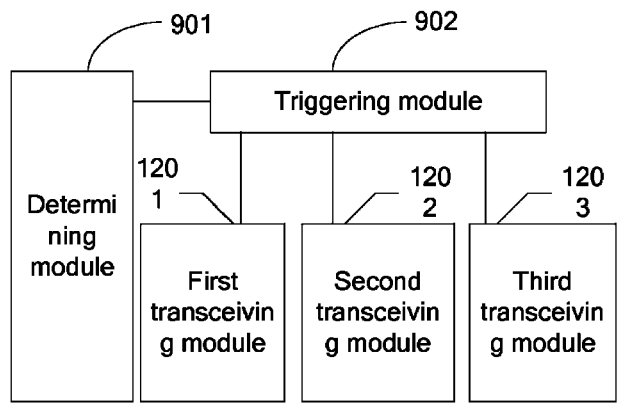
FIG. 12 is a schematic diagram of a logical structure of a machine-to-machine communications service management entity according to another embodiment of the present invention.

If the determining module 901 determines, according to the locating information, that the entity that performs privacy inspection is the M2M service management entity, a machine-to-machine communications service management entity further includes a first transceiving module 1201, a second transceiving module 1202, or a third transceiving module 1203. As shown in FIG. 12, another embodiment of the present invention provides a machine-to-machine communications service management entity, where:

the first transceiving module 1201 is configured to, send an LCS service request to a 3rd-Generation Partnership Project 3GPP location server and receive an obtained result of privacy inspection that is performed by the 3GPP location server, when a result of privacy inspection is that the M2M device is allowed to be located;

the second transceiving module 1202 is configured to, send an LCS service request to a 3rd-Generation Partnership Project 3GPP location server and receive a locating result of locating the M2M device from the 3rd-Generation Partnership Project 3GPP location server, when a result of privacy inspection is that the M2M device is allowed to be located; and the third transceiving module 1203 is configured to, send an LCS service request to the M2M device and receive a locating result of locating the M2M device from the M2M device, when a result of privacy inspection is that the M2M device is allowed to be located.

In the first transceiving module 1201 shown in FIG. 12, the LCS service request includes a locating identifier of the M2M service management entity, where the locating identifier is used to instruct the 3GPP network element to avoid privacy inspection that is to be performed again, or the LCS service request includes an indication identifier that is used to indicate that the M2M service management entity has performed the privacy inspection, and the 3GPP network element determines whether the privacy inspection needs to be performed again.

Figure 13:
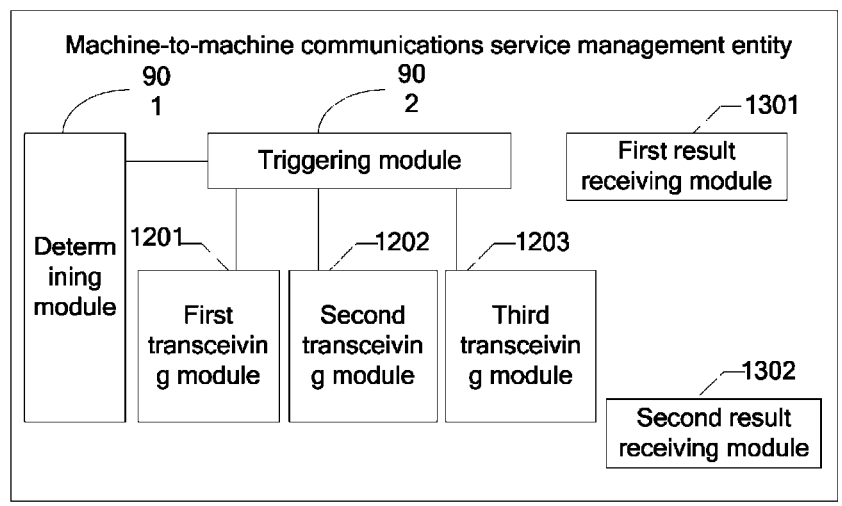
FIG. 13 is a schematic diagram of a logical structure of a machine-to-machine communications service management entity according to another embodiment of the present invention.

The machine-to-machine communications service management entity shown in FIG. 9 or FIG. 12 may further include a first result receiving module 1301 or a second result receiving module 1302. As shown in FIG. 13, another embodiment of the present invention provides a machine-to-machine communications service management entity, where:

the first result receiving module 1301 is configured to receive a locating result of locating the M2M device; and the second result receiving module 1302 is configured to receive a result of the privacy inspection that is performed by the M2M device.

In the machine-to-machine communications service management entity shown in any one of FIG. 9 to FIG. 13, the entity that performs privacy inspection is further configured to send a notification to a user equipment; the entity that performs privacy inspection is further configured to send an authentication request to the user equipment; and the entity that performs privacy inspection is further configured to receive an authentication response to the authentication request, where the authentication response includes information about whether the M2M device is allowed to be located.

To reduce an overhead and improve locating efficiency or improve user experience, in the machine-to-machine communications service management entity shown in any one of FIG. 9 to FIG. 13, the entity that performs privacy inspection may further send a combined notification to the user equipment according to privacy setting information, where the combined notification is used to notify that locating is to be performed on a group of M2M devices. That is, a group of devices of a user are all allowed to be located and the M2M service management entity combines these notifications into one notification message according to a group notification function that is enabled in privacy setting, and simultaneously sends the notifications to a Notified device (that is, to the user) at a certain time point. The entity that performs privacy inspection may also send a combined authentication request to the user equipment according to the privacy setting information, where the combined authentication request is used to request that locating be performed on a group of M2M devices. Accordingly, the Notified device needs to return, for the combined notification, only one notification response sent by the user and return, for the combined authentication request, one authentication response sent by the user. If the authentication response is that the M2M device is allowed to be located, this is a function of associating devices of the same type provided in this embodiment of the present invention, that is, during authentication, after the Notified device allows a third party to locate a certain M2M device of the user, all M2M devices that are of the same type and are owned by the user may be subsequently located without a need of authentication, so as to reduce an overhead and improving user experience. The user may set the function of associating devices of the same type when setting the privacy setting information, and a platform enables, according to a subsequent authentication response of the user, the function of associating devices of the same type, so as to reduce an overhead of an authentication message for the user.

Figure 14:
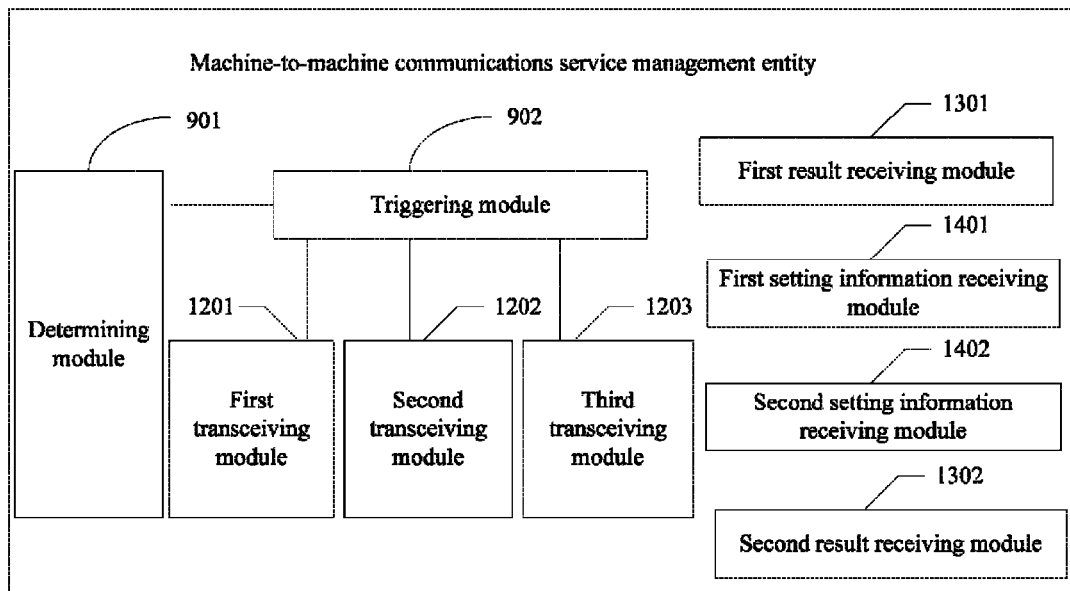
FIG. 14 is a schematic diagram of a logical structure of a machine-to-machine communications service management entity according to another embodiment of the present invention.

The machine-to-machine communications service management entity shown in any one of FIG. 9 to FIG. 13 further includes a first setting information receiving module 1401 and/or a second setting information receiving module 1402. As shown in FIG. 14, another embodiment of the present invention provides a machine-to-machine communications service management entity, where:

the first setting information receiving module 1401 is configured to receive privacy setting information of direct locating, where the privacy setting information of direct locating is used to directly allow locating that is performed on an M2M device of the same type as the M2M device; and the second setting information receiving module 1402 is configured to receive area permitted privacy setting information, where the area permitted privacy setting information is used to allow different LCS service request parties to locate the M2M device in different areas.

Figure 15:
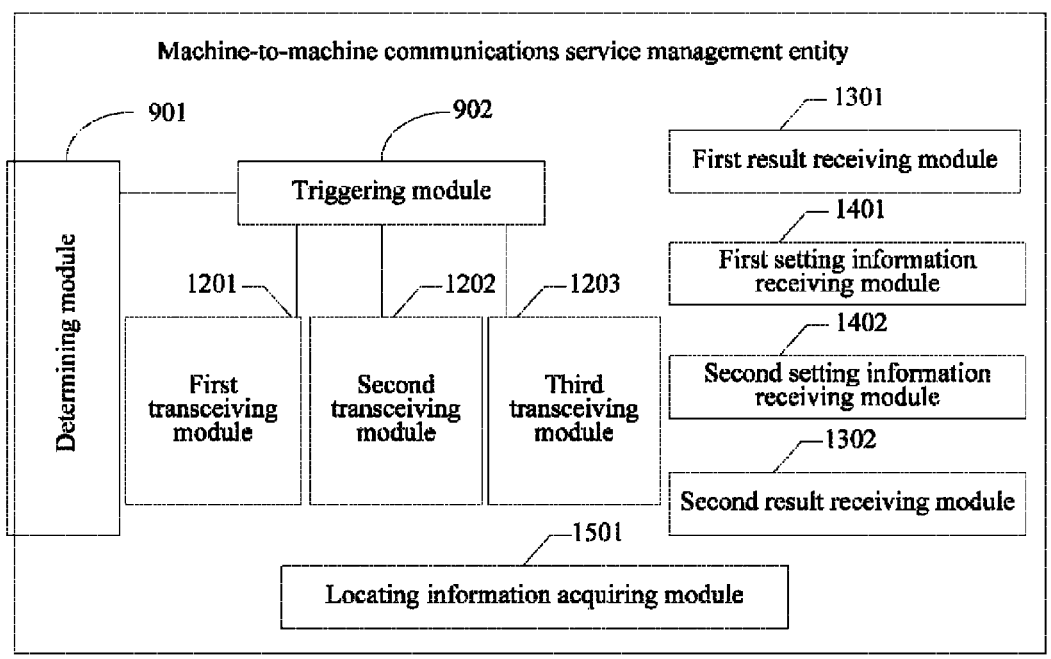
FIG. 15 is a schematic diagram of a logical structure of a machine-to-machine communications service management entity according to another embodiment of the present invention.

The machine-to-machine communications service management entity shown in any one of FIG. 9 to FIG. 14 may further include a locating information acquiring module 1501. As shown in FIG. 15, another embodiment of the present invention provides a machine-to-machine communications service management entity, where the locating information acquiring module 1501 is configured to acquire locating information, where the locating information includes privacy setting information and locating type information.

Figure 16:
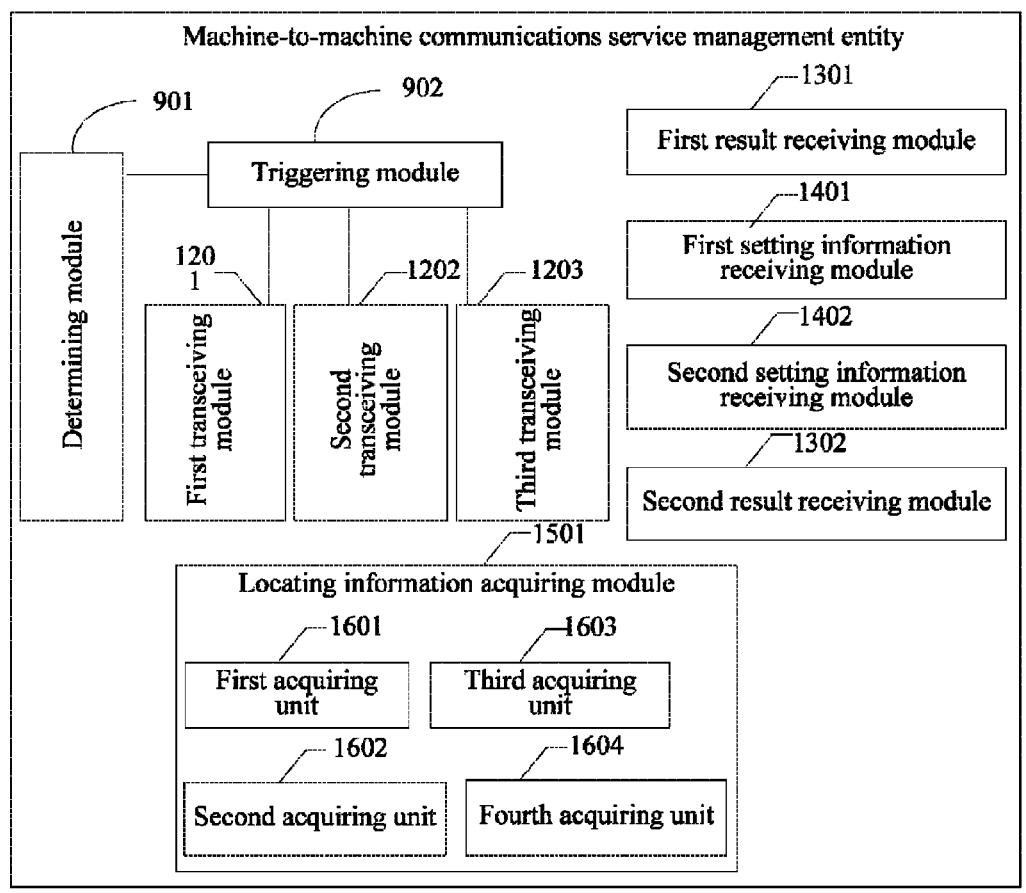
FIG. 16 is a schematic diagram of a logical structure of a machine-to-machine communications service management entity according to another embodiment of the present invention.

The machine-to-machine communications service management entity shown in FIG. 15 may include a first acquiring unit 1601, a second acquiring unit 1602, a third acquiring unit 1603, or a fourth acquiring unit 1604. As shown in FIG. 16, another embodiment of the present invention provides a machine-to-machine communications service management entity, where:

the first acquiring unit 1601 is configured to perform acquisition by using acquired capability information reported by an M2M device;

the second acquiring unit 1602 is configured to perform acquisition by using user data that is acquired from an Rg interface in the 3GPP;

the third acquiring unit 1603 is configured to perform acquisition through a general user data interface that is defined in OMA SUPM; and the fourth acquiring unit 1604 is configured to perform acquisition by using user configuration information that is acquired through an application programming interface API.

Figure 17:
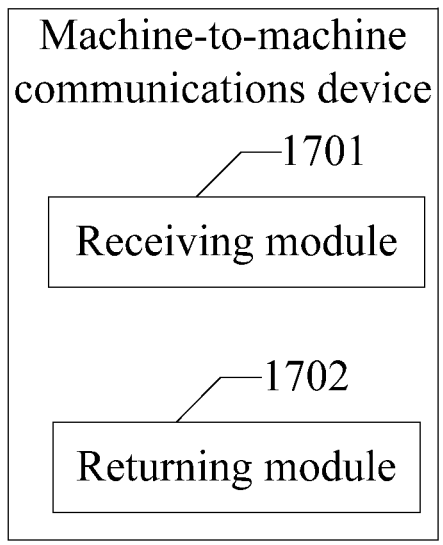
FIG. 17 is a schematic diagram of a logical structure of a machine-to-machine communications device according to an embodiment of the present invention.

FIG. 17 is a schematic diagram of a logical structure of a machine-to-machine communications device according to an embodiment of the present invention. To facilitate the description, only a part related to the embodiment of the present invention is illustrated. The machine-to-machine communications device shown in FIG. 17 includes:

a receiving module 1701, configured to receive a location access message or a privacy inspection request, where the location access message or the privacy inspection request is sent by an M2M service management entity; and a returning module 1702, configured to return an authentication response for privacy inspection to the M2M service management entity.

Figure 18:
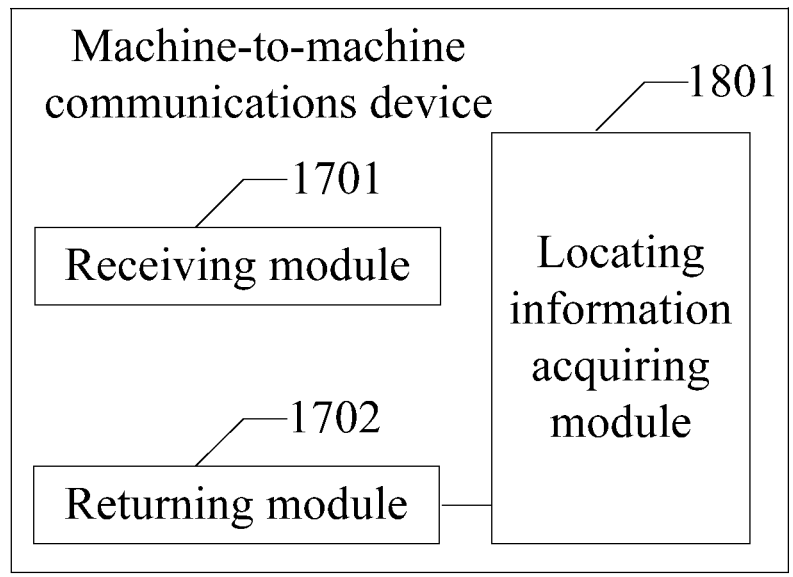
FIG. 18 is a schematic diagram of a logical structure of a machine-to-machine communications device according to another embodiment of the present invention.

The machine-to-machine communications device shown in FIG. 17 may further include a location information acquiring module 1801. As shown in FIG. 18, another embodiment of the present invention provides a machine-to-machine communications device. The location information acquiring module 1801 is configured to acquire location information of the M2M device if the authentication response is that the M2M device is allowed to be located.

Figure 19:
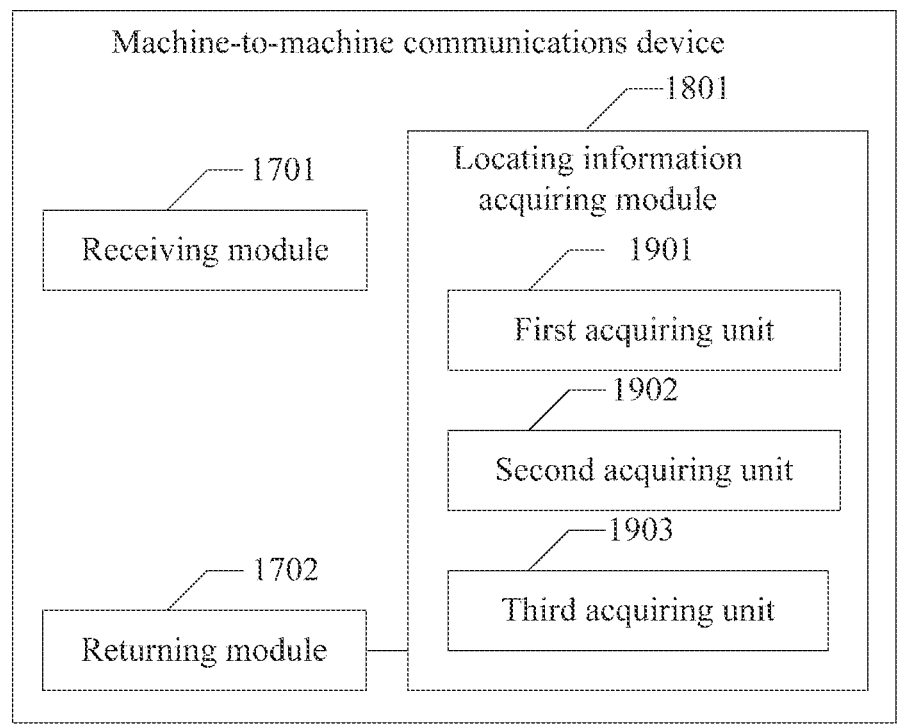
FIG. 19 is a schematic diagram of a logical structure of a machine-to-machine communications device according to another embodiment of the present invention.

The information acquiring module 1801 shown in FIG. 17 may further include a first acquiring unit 1901, a second acquiring unit 1902, or a third acquiring unit 1903. As shown in FIG. 19, another embodiment of the present invention provides a machine-to-machine communications device, where:

the first acquiring unit 1901 is configured to acquire location information of the M2M device by using its own global positioning system GPS;

the second acquiring unit 1902 is configured to acquire location information of the M2M device from a 3rd-Generation Partnership Project 3GPP network element, and specifically, the second acquiring unit 1902 is configured to acquire location information through an MO-LR locating procedure, where a locating identifier of an LCS service request party or a service management entity or an indication indicating that the location information is used for M2M communications is carried; and the third acquiring unit 1903 is configured to acquire location information of the M2M device by using a wireless sensor network WSN, and specifically, the third acquiring unit 1903 is configured to, a privacy protection function of the service management entity sends a location access message or a privacy inspection command to a reference node according a configured URI of the reference node.

Figure 20:
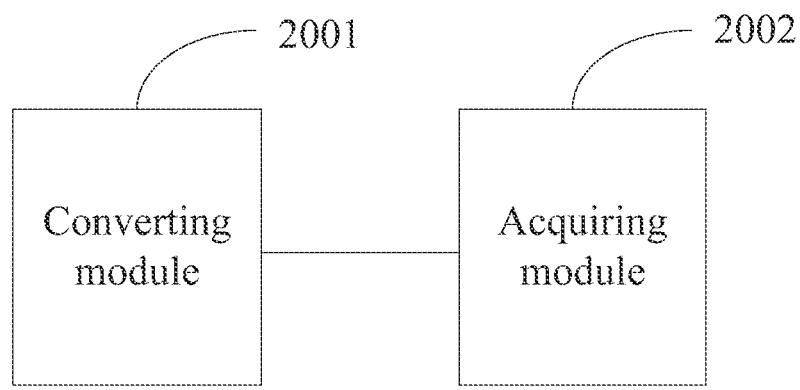
FIG. 20 is a schematic diagram of a logical structure of a machine-to-machine communications service management entity according to another embodiment of the present invention.

FIG. 20 is a schematic diagram of a logical structure of a machine-to-machine communications service management entity according to another embodiment of the present invention. To facilitate the description, only a part related to the embodiment of the present invention is illustrated. The machine-to-machine communications service management entity shown in FIG. 20 includes:

a converting module 2001, configured to convert a received location access message into locating signaling that is identifiable for a 3rd-Generation Partnership Project 3GPP network element or privacy profile register PPR; and an acquiring module 2002, configured to interact with the 3GPP network element or privacy profile register PPR to acquire location information of an M2M device.

Figure 21:
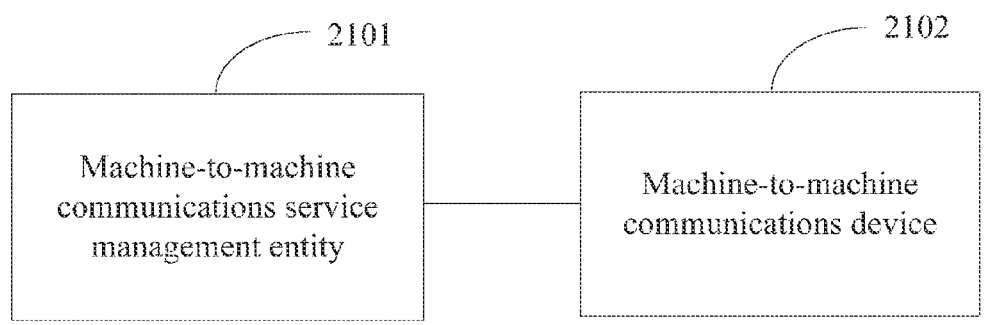
FIG. 21 is a schematic diagram of a logical structure of a machine-to-machine communications privacy protection system according to an embodiment of the present invention.

FIG. 21 is a schematic diagram of a logical structure of a machine-to-machine communications privacy protection system according to an embodiment of the present invention. To facilitate the description, only a part related to the embodiment of the present invention is illustrated. The system shown in FIG. 21 includes a machine-to-machine communications service management entity 2101 and a machine-to-machine communications device 2102, where:

the machine-to-machine communications service management entity 2101 is configured to, after receiving a location access message, determine, according to locating information, an entity that performs privacy inspection, and trigger the entity that performs privacy inspection to perform privacy inspection; and the machine-to-machine communications device 2102 is configured to receive a location access message or a privacy inspection request, where the location access message or the privacy inspection request is sent by the machine-to-machine communications service management entity 2101, and return an authentication response for privacy inspection to the machine-to-machine communications service management entity.

Figure 22:
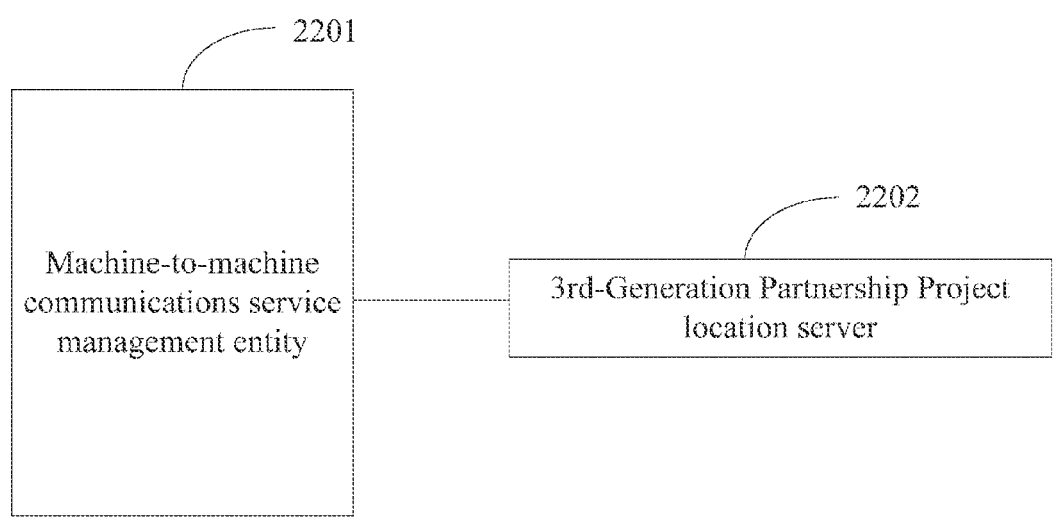
FIG. 22 is a schematic diagram of a logical structure of a machine-to-machine communications privacy protection system according to another embodiment of the present invention.

FIG. 22 is a schematic diagram of a logical structure of a machine-to-machine communications privacy protection system according to another embodiment of the present invention. To facilitate the description, only a part related to the embodiment of the present invention is illustrated. The system shown in FIG. 22 includes a machine-to-machine communications service management entity 2201 and a 3rd-Generation Partnership Project location server 2202, where:

the machine-to-machine communications service management entity 2201 is configured to, after receiving a location access message, determine, according to locating information, an entity that performs privacy inspection, and trigger the entity that performs privacy inspection to perform privacy inspection; and the 3rd-Generation Partnership Project location server 2202 is configured to receive an LCS service request sent by the machine-to-machine communications service management entity 2201, and perform the privacy inspection.

Figure 23:
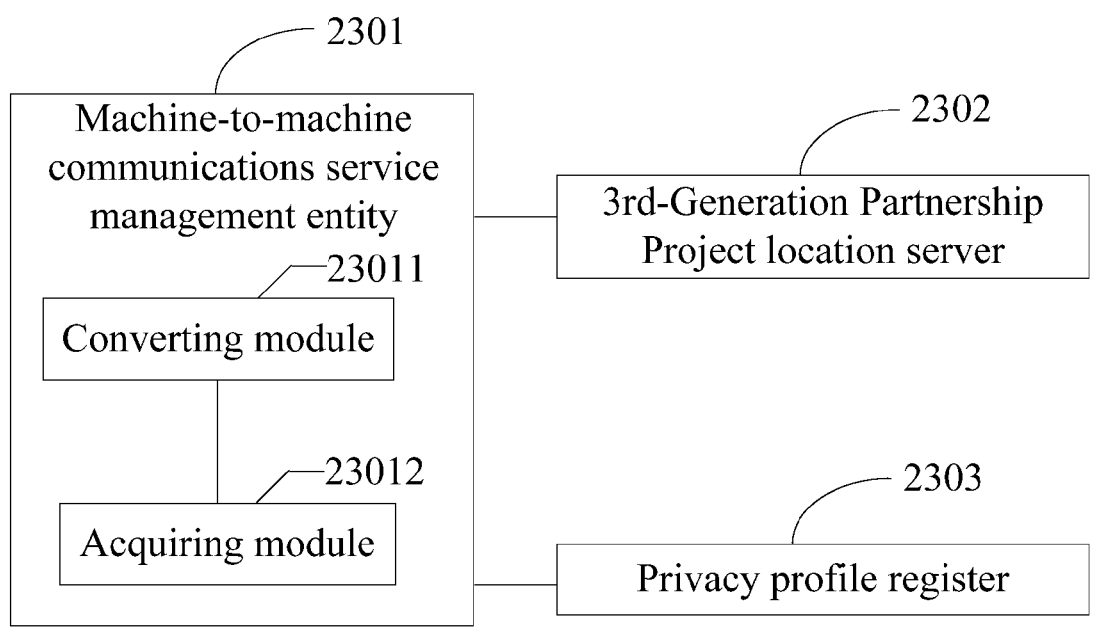
FIG. 23 is a schematic diagram of a logical structure of a machine-to-machine communications privacy protection system according to another embodiment of the present invention.

FIG. 23 is a schematic diagram of a logical structure of a machine-to-machine communications privacy protection system according to another embodiment of the present invention. To facilitate the description, only a part related to the embodiment of the present invention is illustrated. The system shown in FIG. 23 includes a machine-to-machine communications service management entity 2301 and a network element 2302 or a privacy profile register 2303 on a 3rd-Generation Partnership Project network, where:

the machine-to-machine communications service management entity 2301 includes a converting module 23011 and an acquiring module 23012;

the converting module 23011 is configured to convert a received location access message into locating signaling that is identifiable for the network element 2302 or the privacy profile register 2303 on the 3rd-Generation Partnership Project network;

the acquiring module 23012 is configured to interact with the 3rd-Generation Partnership Project network element 2302 or the privacy profile register 2303 to acquire location information of a machine-to-machine communications device; and the network element 2302 or the privacy profile register 2303 on the 3rd-Generation Partnership Project network is configured to acquire the location information of the machine-to-machine communications device and provide the location information of the machine-to-machine communications device for the machine-to-machine communications service management entity 2301.

It should be noted that content such as information exchange between each module/unit of the apparatuses and execution processes is based on the same ideas of the method embodiments of the present invention, and therefore brings the same technical effects as the method embodiments of the present invention. For details, reference may be made to the description in the method embodiments of the present invention, which are not described here again.

Persons skilled in the art may understand that all or part of the steps of the methods in the embodiments may be implemented by a program instructing relevant hardware. The program may be stored in a computer readable storage medium, and the storage medium may include a read only memory (ROM, Read Only Memory), a random access memory (RAM, Random Access Memory), a magnetic disk, or a compact disk, and so on.

The machine-to-machine communications privacy protection method and system, the machine-to-machine communications service management entity, and the related device according to the embodiments of the present invention are described in detail in the preceding. Specific examples are used for illustrating principles and implementation manners of the present invention. The preceding descriptions about the embodiments are merely used for helping understand the methods and core ideas of the present invention. Meanwhile, persons skilled in the art may make modifications to the specific implementation manners and application scopes according to the idea of the present invention. In conclusion, the content of this specification should not be construed as a limitation to the present invention.

What is claimed is:

1. In a machine-to-machine (M2M) management entity, a method for providing location information comprising:

receiving a location access message from a third party for obtaining location information of an M2M device;

determining, according to a locating type which is configured in the M2M management entity, whether the location information is to be obtained by using a location server or the M2M management entity;

if the location information is to be obtained by using the M2M management entity, obtaining the location information from a location resource of the M2M device; if the location information is to be obtained by using a location server, sending a location service request to the location server and obtaining location information returned from the location server; and returning the obtained information to the third party further including: before obtaining the location information from a location resource of the M2M device, performing a privacy inspection for determining whether the third party has permission to access the location information of the M2M device.

2. The method according to claim 1, further including:

triggering the location server, by sending the location service request, to perform a privacy inspection for determining whether the third party has permission to access the location information of the M2M device.

3. The method according to claim 2, further comprises:

sending, by the location server, a notification to a user equipment that belongs to a same user as the M2M device.

4. The method according to claim 3, wherein the sending, by the location server includes:

sending a combined notification to the user equipment that belongs to the same user as the M2M device according to privacy setting information, wherein the combined notification is used to notify that locating is performed on a group of M2M devices belonging to a same user as the user equipment.

5. A machine-to-machine (M2M) management entity, comprising:
a transceiver;
a processor;
a non-transitory computer readable storage medium coupled to the processor and storing instructions executable by the processor;
wherein:
the transceiver is configured to receive a location access message from a third party for obtaining location information of an M2M device;
the processor is configured to execute the instructions to:
determine, according to a locating type which is configured in the M2M management entity, whether the location information is to be obtained by using a location server or the M2M management entity;
if the location information is to be obtained by using the M2M management entity, obtain the location information from a location resource of the M2M device; if the location information is to be obtained by using a location server, send a location service request to the location server and obtain location information returned from the location server; and
the transceiver is further configured to transmit the obtained location information to the third party
wherein before obtaining the location information from a location resource of the M2M device, the processor further performs a privacy inspection for determining whether the third party has permission to access the location information of the M2M device.

* * * * *